(12) United States Patent
Goel et al.

(10) Patent No.: US 10,853,348 B2
(45) Date of Patent: *Dec. 1, 2020

(54) MULTI-USER SEARCH SYSTEM WITH METHODOLOGY FOR PERSONALIZED SEARCH QUERY AUTOCOMPLETE

(71) Applicant: Dropbox, Inc., San Francisco, CA (US)

(72) Inventors: Samir Goel, San Francisco, CA (US); Franck Chastagnol, Woodside, CA (US); Abhishek Agrawal, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 15/960,432

(22) Filed: Apr. 23, 2018

(65) Prior Publication Data

US 2018/0253461 A1 Sep. 6, 2018

Related U.S. Application Data

(63) Continuation of application No. 14/555,171, filed on Nov. 26, 2014, now Pat. No. 9,984,110.
(Continued)

(51) Int. Cl.
*G06F 16/00* (2019.01)
*G06F 16/23* (2019.01)
(Continued)

(52) U.S. Cl.
CPC ........ *G06F 16/2329* (2019.01); *G06F 16/134* (2019.01); *G06F 16/148* (2019.01);
(Continued)

(58) Field of Classification Search
CPC ............. G06F 17/277; G06F 17/30368; G06F 17/30312; G06F 17/30386;
(Continued)

(56) References Cited

U.S. PATENT DOCUMENTS 6,067,541 A 5/2000 Raju
6,151,643 A 11/2000 Cheng
(Continued)

FOREIGN PATENT DOCUMENTS

CA 2421825 A1 3/2004
CA 2637218 A1 6/2008
(Continued)

OTHER PUBLICATIONS

Decision on Appeal for U.S. Appl. No. 15/169,437 dated Jan. 3, 2019, 5 pages.
(Continued)

*Primary Examiner* — Shiow-Jy Fan
(74) *Attorney, Agent, or Firm* — Hickman Palermo Becker Bingham LLP; Adam C. Stone

(57) ABSTRACT

A multi-user search system with methodology for personalized search query autocomplete. In one embodiment, for example, a computer-implemented method includes: receiving a search query having an incomplete token; generating an index key that is composed of both (a) an identifier of a document namespace that a user account associated with the search query is authorized to access, and (b) the incomplete token; accessing an index dictionary with the index key to identify a plurality of index tokens, each index token of the plurality of index tokens having the identifier of the document namespace as part of the index token and having the incomplete token as a token portion of the index token or as a prefix of the token portion of the index token; iterating over the plurality of index tokens until a stop condition is reached; and returning an answer to the search query based on the iterating.

20 Claims, 9 Drawing Sheets

Related U.S. Application Data

(60) Provisional application No. 62/040,382, filed on Aug. 21, 2014.

(51) Int. Cl.
*G06F 16/22* (2019.01)
*G06F 16/24* (2019.01)
*G06F 16/84* (2019.01)
*G06F 16/93* (2019.01)
*G06F 16/13* (2019.01)
*G06F 16/14* (2019.01)
*G06F 16/21* (2019.01)
*G06F 16/31* (2019.01)
*G06F 16/9535* (2019.01)
*G06F 16/2455* (2019.01)
*G06F 21/62* (2013.01)
*G06F 40/284* (2020.01)
*H04L 29/06* (2006.01)

(52) U.S. Cl.
CPC .......... *G06F 16/219* (2019.01); *G06F 16/22* (2019.01); *G06F 16/2228* (2019.01); *G06F 16/2358* (2019.01); *G06F 16/24* (2019.01); *G06F 16/24564* (2019.01); *G06F 16/313* (2019.01); *G06F 16/319* (2019.01); *G06F 16/328* (2019.01); *G06F 16/84* (2019.01); *G06F 16/93* (2019.01); *G06F 16/9535* (2019.01); *G06F 21/6218* (2013.01); *G06F 40/284* (2020.01); *H04L 63/08* (2013.01); *H04L 63/101* (2013.01)

(58) Field of Classification Search
CPC ......... G06F 17/30914; G06F 17/30321; G06F 17/30011; G06F 17/30507; G06F 17/30867; G06F 17/30622; G06F 17/30631; G06F 17/30094; G06F 17/30106; G06F 17/30309; G06F 17/30356; G06F 17/30616; G06F 16/148; G06F 16/134; G06F 40/284; G06F 16/328; G06F 16/9535; G06F 16/2358; G06F 16/24564; G06F 16/84; G06F 16/319; G06F 16/93; G06F 16/22; G06F 16/24; G06F 16/2329; G06F 16/313; G06F 16/2228; G06F 16/219; G06F 21/6218; H04L 63/08; H04L 63/101
See application file for complete search history.

(56) References Cited

U.S. PATENT DOCUMENTS

| | | |
|---|---|---|
| 6,389,412 B1 | 5/2002 | Light |
| 6,510,439 B1 * | 1/2003 | Rangarajan ........... G06F 16/972 715/229 |
| 6,751,603 B1 | 6/2004 | Bauer et al. |
| 7,171,404 B2 * | 1/2007 | Lindblad ................ G06F 16/81 |
| 7,194,487 B1 | 3/2007 | Kekre |
| 7,437,353 B2 | 10/2008 | Marmaros et al. |
| 7,508,419 B2 | 3/2009 | Toyama et al. |
| 7,634,517 B1 | 12/2009 | Burrows et al. |
| 7,693,813 B1 | 4/2010 | Cao |
| 7,702,614 B1 | 4/2010 | Shah |
| 8,005,919 B2 | 8/2011 | Mehanna |
| 8,126,895 B2 | 2/2012 | Sargent et al. |
| 8,510,657 B2 | 8/2013 | Gilbert et al. |
| 8,620,923 B1 | 12/2013 | Wormley |
| 8,682,901 B1 | 3/2014 | Cao |
| 8,756,215 B2 | 6/2014 | Shikha |
| 8,825,602 B1 | 9/2014 | Desai |
| 8,868,677 B2 | 10/2014 | Molaro et al. |
| 9,542,391 B1 * | 1/2017 | Eisner ................ G06F 16/1767 |
| 9,984,110 B2 | 5/2018 | Goel et al. |
| 2002/0078134 A1 | 6/2002 | Stone |
| 2004/0064512 A1 | 4/2004 | Arora |
| 2004/0064568 A1 | 4/2004 | Arora |
| 2004/0070678 A1 | 4/2004 | Yoyama |
| 2004/0078370 A1 | 4/2004 | Acree |
| 2004/0083091 A1 | 4/2004 | Le Et La |
| 2004/0225963 A1 | 11/2004 | Agarwal |
| 2004/0230903 A1 | 11/2004 | Elza |
| 2005/0028082 A1 | 2/2005 | Topalov et al. |
| 2005/0055364 A1 | 3/2005 | Frieder |
| 2005/0165838 A1 | 7/2005 | Fontoura |
| 2006/0031198 A1 | 2/2006 | Newbold et al. |
| 2006/0053157 A1 | 3/2006 | Pitts |
| 2007/0043750 A1 | 2/2007 | Dingle |
| 2007/0055926 A1 | 3/2007 | Christiansen et al. |
| 2007/0067726 A1 | 3/2007 | Flynt et al. |
| 2008/0005184 A1 | 1/2008 | Myllyla et al. |
| 2008/0243788 A1 | 10/2008 | Reztlaff et al. |
| 2008/0243828 A1 | 10/2008 | Reztlaff et al. |
| 2008/0243958 A1 | 10/2008 | Prahlad et al. |
| 2008/0250021 A1 | 10/2008 | Boys et al. |
| 2008/0271156 A1 | 10/2008 | Lipinski |
| 2008/0294674 A1 | 11/2008 | Reztlaff, II et al. |
| 2008/0313198 A1 | 12/2008 | Kim et al. |
| 2009/0019548 A1 | 1/2009 | Reid |
| 2009/0063448 A1 | 3/2009 | Depue et al. |
| 2009/0083268 A1 | 3/2009 | Coqueret |
| 2009/0089323 A1 | 4/2009 | Yoshihama |
| 2009/0097651 A1 | 4/2009 | Whillock |
| 2009/0164437 A1 | 6/2009 | Torbjornsen |
| 2009/0228528 A1 | 9/2009 | Ercegovac et al. |
| 2009/0274158 A1 | 11/2009 | Sharp |
| 2009/0276401 A1 | 11/2009 | Groble et al. |
| 2009/0276455 A1 | 11/2009 | Yu et al. |
| 2009/0313503 A1 | 12/2009 | Atluri |
| 2010/0161617 A1 | 6/2010 | Cao et al. |
| 2010/0174709 A1 | 7/2010 | Hansen et al. |
| 2010/0306011 A1 | 12/2010 | Lebeau et al. |
| 2011/0029504 A1 | 2/2011 | King |
| 2011/0078243 A1 * | 3/2011 | Carpenter ........... G06F 16/9535 709/204 |
| 2011/0191767 A1 | 8/2011 | Pinsky |
| 2011/0202541 A1 | 8/2011 | Permandla et al. |
| 2011/0225627 A1 | 9/2011 | Uchida et al. |
| 2011/0246475 A1 | 10/2011 | Shelton |
| 2011/0258198 A1 | 10/2011 | Sun et al. |
| 2012/0131009 A1 | 5/2012 | Nath et al. |
| 2012/0150796 A1 | 6/2012 | Martick |
| 2012/0150864 A1 | 6/2012 | Palakodety et al. |
| 2012/0158689 A1 | 6/2012 | Doshi et al. |
| 2012/0215785 A1 | 8/2012 | Singh |
| 2012/0233209 A1 | 9/2012 | Cheng et al. |
| 2012/0331568 A1 | 12/2012 | Weinstein et al. |
| 2013/0018916 A1 | 1/2013 | Busch |
| 2013/0080912 A1 | 3/2013 | Job et al. |
| 2013/0124467 A1 | 5/2013 | Naidu |
| 2013/0138658 A1 | 5/2013 | Flick |
| 2013/0185439 A1 | 7/2013 | Velasco |
| 2013/0191414 A1 | 7/2013 | Srivastava |
| 2013/0226871 A1 | 8/2013 | Sarnowski |
| 2013/0275548 A1 | 10/2013 | Molaro et al. |
| 2013/0332575 A1 | 12/2013 | Song |
| 2014/0019405 A1 | 1/2014 | Borthakur et al. |
| 2014/0032703 A1 | 1/2014 | Wormley |
| 2014/0047349 A1 | 2/2014 | Kulkarni et al. |
| 2014/0058732 A1 | 2/2014 | Labsky |
| 2014/0081948 A1 | 3/2014 | Doshi et al. |
| 2014/0095467 A1 | 4/2014 | Bueche |
| 2014/0129712 A1 | 5/2014 | Sharp |
| 2014/0136543 A1 | 5/2014 | Frieden et al. |
| 2014/0149401 A1 * | 5/2014 | Liu ........................ G06F 16/319 707/723 |
| 2014/0156669 A1 | 6/2014 | Bati |
| 2014/0229426 A1 | 8/2014 | Gootee |
| 2014/0304618 A1 | 10/2014 | Carriero et al. |
| 2014/0379661 A1 | 12/2014 | Marcus et al. |
| 2015/0026153 A1 * | 1/2015 | Gupta ...................... G06N 5/04 707/711 |

(56) References Cited

U.S. PATENT DOCUMENTS

| | | |
|---|---|---|
| 2015/0112996 A1 | 4/2015 | Mishra |
| 2015/0193399 A1 | 7/2015 | Woker |
| 2015/0281401 A1 | 10/2015 | Le |
| 2016/0055188 A1 | 2/2016 | Goel et al. |
| 2016/0224677 A1 | 8/2016 | Goel |
| 2016/0275197 A1 | 9/2016 | Goel et al. |
| 2017/0011084 A1 | 1/2017 | Goel |
| 2017/0102852 A1 | 4/2017 | Agrawal et al. |

FOREIGN PATENT DOCUMENTS

| | | | |
|---|---|---|---|
| CN | 1755677 A | | 4/2006 |
| CN | 102567489 A | | 7/2012 |
| CN | 103597474 A | | 2/2014 |
| JP | H07334406 A | | 12/1995 |
| JP | 2002149970 A | | 5/2002 |
| JP | 2003162441 A | | 6/2003 |
| JP | 2003162449 A | | 6/2003 |
| JP | 2003337819 A | | 11/2003 |
| JP | 2004164555 A | | 6/2004 |
| JP | 2006185368 A | | 7/2006 |
| JP | 2007122371 A | | 5/2007 |
| JP | 2010505187 A | | 2/2010 |
| JP | 2010522936 A | | 7/2010 |
| JP | 2010537324 A | | 12/2010 |
| JP | 2010538366 A | | 12/2010 |
| JP | 2015530292 A | | 11/2012 |
| KR | 10-2004-0039691 | | 5/2004 |
| KR | 10-2004-0077918 | | 9/2004 |
| KR | 10-2006-0116042 | | 11/2006 |
| KR | 10-2007-0051569 | | 5/2007 |
| WO | WO 03/079270 A1 | | 9/2003 |
| WO | WO2005/114470 A1 | | 12/2005 |
| WO | WO2012/095973 A1 | | 7/2012 |
| WO | WO2013/147785 A1 | | 10/2013 |
| WO | WO2014/010082 A1 | | 1/2014 |
| WO | 2014133495 A1 | | 9/2014 |

OTHER PUBLICATIONS

Notice of Allowance from U.S. Appl. No. 15/640,121, dated Oct. 3, 2019, 7 pages.
Notification of the First Office Action and Search Report for Chinese Application No. 201580045069.9 dated Sep. 23, 2019, 20 pages.
Goel, U.S. Appl. No. 14/856,295, filed Sep. 16, 2015, Advisory Action, dated Feb. 22, 2017.
Goel, U.S. Appl. No. 15/275,238, filed Sep. 23, 2016, Office Action, dated Nov. 15, 2017.
Goel, U.S. Appl. No. 15/275,238, filed Sep. 23, 2016, Final Office Action, dated May 15, 2018.
Goel, U.S. Appl. No. 15/169,437, filed May 31, 2016, Interview Summary, dated Jun. 29, 2017.
Goel, U.S. Appl. No. 15/169,437, filed May 31, 2016, Final Office Action, dated May 31, 2017.
Goel, U.S. Appl. No. 15/169,437, filed May 31, 2016, Examiners Answers, dated Feb. 2, 2018.
Goel, U.S. Appl. No. 15/169,437, filed May 31, 2016, Appeal Brief, dated Sep. 29, 2017.
Goel, U.S. Appl. No. 14/555,147, filed Nov. 26, 2014, Notice of Allowance, dated Feb. 1, 2018.
Goel, U.S. Appl. No. 15/169,437, filed May 31, 2016, Interview Summary, dated Apr. 6, 2017.
U.S. Appl. No. 14/555,140, filed Nov. 26, 2014, Interview Summary, dated Nov. 19, 2015.
Goel, U.S. Appl. No. 14/856,295, filed Sep. 16, 2015, Office Action, dated Jun. 30, 2017.
Goel, U.S. Appl. No. 14/856,295, filed Sep. 16, 2015, Notice of Allowance, dated Dec. 12, 2017.
Goel, U.S. Appl. No. 14/856,295, filed Sep. 16, 2015, Final Office Action, dated Dec. 21, 2016.
Goel, U.S. Appl. No. 14/555,180, filed Nov. 26, 2014, Notice of Allowance, dated Jun. 15, 2017.
Goel, U.S. Appl. No. 14/555,171, filed Nov. 26, 2014, Notice of Allowance, dated Feb. 1, 2018.
Goel, U.S. Appl. No. 14/555,171, filed Nov. 26, 2014, Office Action, dated Jul. 21, 2017.
Goel, U.S. Appl. No. 15/169,437, filed May 31, 2016, Advisory Action, dated Jul. 17, 2017.
U.S. Appl. No. 14/609,930, filed Jan. 30, 2015, Office Action, dated Apr. 3, 2015.
U.S. Appl. No. 14/856,295, filed Sep. 16, 2015, Office Action, dated Jul. 15, 2016.
U.S. Appl. No. 14/609,937, filed Jan. 30, 2015, Office Action, dated Nov. 9, 2015.
U.S. Appl. No. 14/609,937, filed Jan. 30, 2015, Office Action, dated Mar. 19, 2015.
U.S. Appl. No. 14/609,937, filed Jan. 30, 2015, Notice of Allowance, dated Feb. 24, 2016.
U.S. Appl. No. 14/609,937, filed Jan. 30, 2015, Final Office Action, dated Jul. 7, 2015.
Goel, U.S. Appl. No. 14/555,147, filed Nov. 26, 2014, Office Action, dated Jul. 13, 2017.
U.S. Appl. No. 14/609,937, filed Jan. 30, 2015, Interview Summary, dated Jun. 11, 2015.
U.S. Appl. No. 14/555,140, filed Nov. 26, 2014, Final Office Action, dated Jul. 7, 2015.
U.S. Appl. No. 14/609,930, filed Jan. 30, 2015, Notice of Allowance, dated Jul. 8, 2015.
U.S. Appl. No. 14/555,180, filed Nov. 26, 2014, Office Action, dated Dec. 1, 2016.
U.S. Appl. No. 14/555,140, filed Nov. 26, 2014, Office Action, dated Oct. 1, 2015.
U.S. Appl. No. 14/555,140, filed Nov. 26, 2014, Office Action, dated Mar. 2, 2016.
U.S. Appl. No. 14/555,140, filed Nov. 26, 2014, Office Action, dated Mar. 18, 2015.
U.S. Appl. No. 14/555,140, filed Nov. 26, 2014, Notice of Allowance, dated Jul. 29, 2016.
U.S. Appl. No. 15/169,437, filed May 31, 2016, Office Action, dated Jan. 10, 2017.
U.S. Appl. No. 14/609,937, filed Jan. 30, 2015, Advisory Action, dated Oct. 6, 2015.
Office Action for Canada Application No. 2,956,141 dated Dec. 23, 2019, 1 page.
Goel, U.S. Appl. No. 15/275,238, filed Sep. 23, 2016, Notice of Allowance, dated Jul. 20, 2018.
Goel, U.S. Appl. No. 15/169,437, filed May 31, 2016, Notice of Allowance, dated Apr. 3, 2019.
Parker-Wood et al., "Security Aware Paritioning for Efficient File Search", dated 2010, IEEE, 14 pages.
Korean Patent Office, "Saerch Report" in application No. 10-2017-7004799, dated May 15, 2017, 3 pages.
Korean Claims in application No. 10-2017-7004799, dated May 2017, 7 pages.
International Searching Authority, "Search Report" in application No. PCT/US2016/015575, dated May 10, 2016, 11 pages.
International Searching Authority, "Search Report" in application No. PCT/US2015/030476, dated Aug. 19, 2015, 11 pages.
International Searching Authority, "Search Report" in application No. PCT/US2015/030474, dated Aug. 19, 2015, 8 pages.
European Patent Office, "Search Report" in application No. PCT/US2015/030474, dated Nov. 20, 2015, 21 pages.
European Claims in application No. PCT/US2015/030476, dated Aug. 2015, 9 pages.
European Claims in application No. PCT/US2015/030474, dated Nov. 2015, 10 pages.
Current Claims in application No. PCT/US2016/015575, dated May 2010, 6 pages.
Concise explanation of the Korean language search report, in application No. 10-2017-7004799, dated Mar. 7, 2017, 1 page.
Claims in Korean Application No. 10-2017-7004799, dated Mar. 2017, 7 pages.

(56) References Cited

OTHER PUBLICATIONS

Claims in application No. PCT/US2015/030476, dated Aug. 2015, 9 pages.
Claims in application No. PCT/US2015/030474, dated Aug. 2015, 10 pages.
LSDS-IR 2010, "Large-Scale Distributed Systems for Information Retrieval 2010," Proceedings of the 8th Workshop on Large-Scale Distributed Systems for Information Retrieval, Jul. 23, 2010, 39 pages.
Ichikawa Y., et al., "Distributed Search Engine for an IaaS Based Cloud," nternational Conference on Broadband and Wireless Computing, Communication and Applications, Oct. 26-28, 2011, pp. 34-39.
Extended European Search Report for EP Application No. 17155084.1 dated May 31, 2017, 4 pages.
Díaz-Sánchez D., et al., "Media Cloud: An Open Cloud Computing Middleware for Content Management," IEEE Transactions on Consumer Electronics, May 2011, vol. 57(2), pp. 970-978.
Co-pending U.S. Appl. No. 14/609,937, filed Jan. 30, 2015, 64 pages.
Co-pending U.S. Appl. No. 14/609,930, filed Jan. 30, 2015, 66 pages.
Co-pending U.S. Appl. No. 14/609,919, filed Jan. 30, 2015, 39 pages.
Examination Search Report for Canada Application No. 3,009,686 dated Jan. 29, 2020, 3 pages.
Non-Final Office Action from U.S. Appl. No. 15/960,431, dated Feb. 13, 2020, 27 pages.
Final Office Action from U.S. Appl. No. 15/960,431, dated Apr. 28, 2020, 20 pages.
Anonymous, "Git Basics—Recording Changes to the Repository," Dec. 30, 2014, XP055570020, retrieved from https://web.archive.org/web/20141230193338/http://gits-cm.com/book/en/v2/Git-Basics-Recording-Changes-to-the-Repository on Mar. 15, 2019, 5 pages.
Anonymous, "Git Tools—Searching," Dec. 24, 2014, XP055569985, retrieved from https://web.archive.org/web/20141224155820/https://git-scm.com/book/en/v2/Git-Tools-Searching on Mar. 15, 2019, 7 pages.
Chacon S., "Pro Git," ISBN: 978-1-43-021833-3, retrieved from http://lproquest.safaribooksonline.com/9781430218333, Aug. 2, 2010.
Communication pursuant to Rule 115(1) EPC for European Application No. 16704989.9, dated May 28, 2020, 11 pages.
Extended European Search Report for EP Application 16152761.9 dated Apr. 28, 2016, 3 pages.
Non-Final Office Action from U.S. Appl. No. 15/905,590, dated Feb. 3, 2020, 16 pages.
"Subversion Book—CollabNet Community Chapter 2 Basic Usage," XP055260783, Jun. 19, 2013, retrieved from the URL: https://web.archive.org/web/20130619235633/http://www.open.collab.net/community/subversion/svnbook/svn.tour.history.html on Mar. 23, 2016, 4 pages.
Final Office Action from U.S. Appl. No. 15/905,590, dated Jul. 28, 2020, 10 pages.
Notice of Allowance from U.S. Appl. No. 15/960,431, dated Apr. 9, 2020, 7 pages.

* cited by examiner

MULTI-USER SEARCH SYSTEM WITH METHODOLOGY FOR PERSONALIZED SEARCH QUERY AUTOCOMPLETE

RELATED APPLICATIONS

This application claims priority as a continuation to U.S. non-provisional application Ser. No. 14/555,171, filed Nov. 26, 2014, which claims priority to U.S. provisional patent application No. 62/040,382, filed Aug. 21, 2014, the entire contents of each which is hereby incorporated by reference in its entirety.

This application is related to the following applications: (1) U.S. non-provisional patent application Ser. No. 14/555, 140, filed on Nov. 26, 2014; and (2) U.S. non-provisional patent application Ser. No. 14/555,180, filed on Nov. 26, 2014.

TECHNICAL FIELD

The disclosed embodiments relate generally to information retrieval computer systems and, more particularly, to a multi-user search system having a methodology for personalized search query autocomplete.

BACKGROUND

Computers are very powerful tools for searching for relevant information among a vast amount of information. Indexes are a common mechanism for efficiently identifying information of interest among a large corpus of information using a computer. A typical index is an organized mapping of keywords to the documents of information from which the keywords were extracted or derived. As an example, an index of the world's publically accessible web pages may map words in the web pages to the subset of the web pages that contain that word.

Between the actual physical index itself (e.g., the index data as stored on one or more computers) and the users of the system, a search system is typically provided as a software cushion or layer. In essence, the search system shields the user from knowing or even caring about underlying index details. Typically, all requests from users for information in the index are processed by the search system. For example, documents relevant to a user's request for information may be identified by the search system using an index, all without user knowledge of the underlying index implementation. In this manner, the search system provides users access to relevant information without concern to how the information is indexed or accessed. One well-known search system for identifying relevant information among the world's publically accessible web pages is the GOOGLE Internet search engine provided by Google Inc. of Mountain View, Calif.

One function of a search system is answer to search queries (or just "queries" for short). A query may be defined as a logical expression including a set of one or more search terms, and results in the identification of a subset of indexed documents. Consider, for instance, the handling of a request for information from an Internet search engine. In operation, this request is typically issued by a client system as one or more Hyper Text Transfer Protocol or "HTTP" requests for retrieving particular search results (e.g., a list of all Internet web pages containing the words "college" and "basketball") from indexes on server computers. In response to this request, the search system typically returns a web page containing hyperlinks to those Internet web pages considered to be most relevant to the search terms "college" and "basketball".

Internet search engines are well-suited for searching all the world's information that is publically available on the Internet. Recently, however, users are beginning to amass a substantial amount of "personal" digital information that is not publically accessible on the Internet or indexed by an Internet search engine. Such information can include, for example, personal digital photos, school, and work documents among other personal and private digital information. In some instances, a user's personal digital information is shared with a defined group users. For example, an employee may share work documents with other colleagues or a user may share digital photos with friends and family.

One way users have recently begun storing and managing all their personal digital information is by using a cloud data storage service. Such services allows users to upload and store their personal digital information on server computers accessible on the Internet or other network from their various end-user computing devices. In some instances, the service may synchronize information between end-user computing devices and service server computers to facilitate user access to information locally at the end-user computing devices. One well-known cloud data storage service is the DROPBOX content management service provided by Dropbox, Inc. of San Francisco, Calif.

Users of cloud data storage services would appreciate ways to search for and locate their personal digital information hosted by such services. Such personal digital information is typically not publically accessible on the Internet. For this and other reasons, Internet search engines are generally not adequate to meet the search needs of these users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
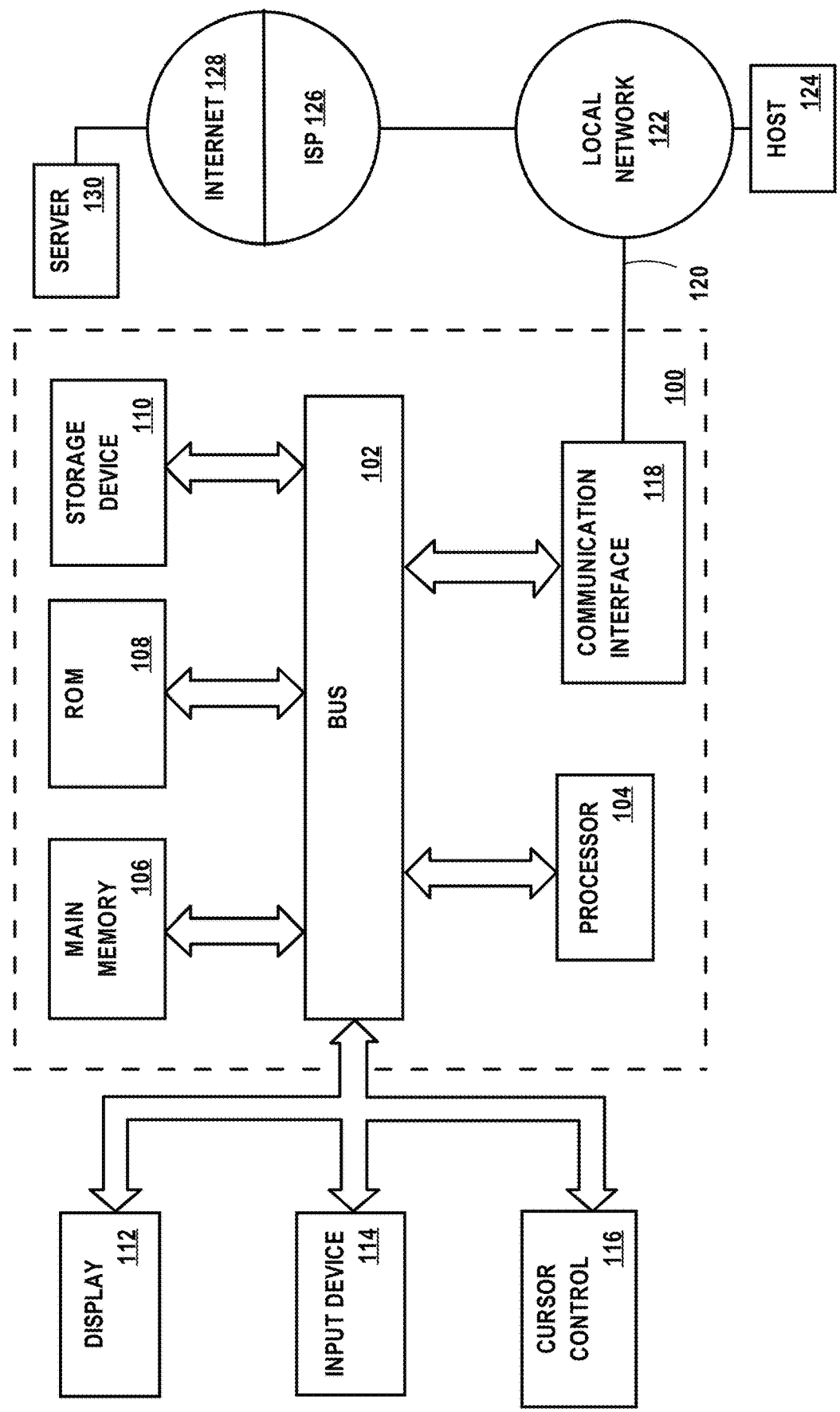
FIG. 1 is a block diagram of a basic computing device in accordance with some embodiments of the invention.

In the following description, for the purposes of explanation, numerous specific details are set forth in order to provide a thorough understanding of the disclosed technologies. It will be apparent, however, that the disclosed technologies can be practiced without these specific details. In other instances, well-known structures and devices are shown in block diagram form in order to avoid unnecessarily obscuring the disclosed technologies. As to the flowcharts, a block within the flowcharts may represent both a method step and an apparatus element for performing the method step. Depending upon the requirements of the particular implementation at hand, the corresponding apparatus element may be configured in hardware, software, firmware or combinations thereof.

It will also be understood that, although the terms "first", "second", etc. may be used herein to describe various elements, these elements should not be limited by these terms. These terms are only used to distinguish one element from another. For example, a first device could be termed a second device, and, similarly, a second device could be termed a first device, without departing from the scope of the invention. The first device and the second device are both devices, but they are not the same device.

The terminology used herein is for the purpose of describing particular implementations only and is not intended to be limiting of the claims. As used in this description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising", when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

OVERVIEW

A multi-user computer search system with a personalized search query autocomplete feature for searching documents is disclosed. The documents may include, for instance, users' personal documents such as, for example, documents associated with users' accounts held with cloud data storage service.

Various embodiments of the invention, among other aspects, facilitate incremental full-text and filename searching of users' personal documents in a multi-user computer search system.

Various embodiments of the invention, among other aspects, effect an improvement in the technical field of information retrieval using computers.

Various embodiments of the invention, among other aspects, improve multi-user cloud data storage services provided by cloud data storage service providers.

Various embodiments of the invention, among other aspects, improve the functioning of multi-user computer search systems.

According to an embodiment of the invention, a first method for personalized search query autocomplete performed in the multi-user computer search system includes: receiving, from an end-user computing device of an authenticated user, a completion search query including a completion token; determining an identifier of an authorized document namespace the authenticated user is permitted to access; generating an index key including the authorized document namespace identifier as a prefix and the completion token as a suffix; accessing an index dictionary with the index key to identify and iterate over a plurality of prefixed index tokens in a lexicographical order of the plurality of prefixed index tokens until a stop condition is reached, each of the plurality of prefixed index tokens including the authorized document namespace identifier as a prefix and the each index token as a suffix, the completion token being a prefix of or matching the each index token; and for each prefixed index token of the plurality of prefixed index tokens, determining whether any documents identified in a postings list associated with the each prefixed index token satisfies the completion query, and returning filenames of any such documents satisfying the completion query in an answer to the completion query.

According to another embodiment of the invention, a second method for personalized search query autocomplete in the multi-user computer search system includes: receiving, from an end-user computing device of an authenticated user, a completion search query including a completion token; determining an identifier of an authorized document namespace the authenticated user is permitted to access; generating an index key including the authorized document namespace identifier as a prefix and the completion token as a suffix; accessing an index dictionary with the index key to identify and iterate over a plurality of prefixed index tokens according to a descending order of sizes of postings lists associated with the plurality of prefixed index tokens until a stop condition is reached, each of the plurality of prefixed index tokens including the authorized document namespace identifier as a prefix and the each index token as a suffix, the completion token being a prefix of or matching the each index token; and for each prefixed index token of the plurality of prefixed index tokens, determining whether any documents identified in a postings list associated with the each prefixed index token satisfies the completion query, and returning filenames of any such documents satisfying the completion query in an answer to the completion query.

According to some embodiments of the invention, the index dictionary includes index tokens extracted from filenames of documents belonging to a plurality of document namespaces.

According to some embodiments of the invention, the stop condition is reached after a threshold number of document filenames are returned in an answer to the completion query.

According to some embodiments of the invention, the stop condition is reached after expiration of a query execution timer.

According to some embodiments of the invention, the stop condition is reached after identifying and iterating over a threshold number of index tokens of the plurality of index tokens.

According to some embodiments of the invention, the completion query includes at least one complete token.

In other aspects, the invention encompasses a computer system and a computer-readable medium configured to carry out the foregoing steps.

Basic Computer System Hardware and Software

The disclosed technologies may be implemented on one or more computing devices. Such a computing device may be implemented in various forms including, but not limited to, a client, a server computer, a network device, a mobile device, a cell phone, a smart phone, a laptop computer, a desktop computer, a workstation computer, a personal digital assistant, a blade server computer, a mainframe computer, and other types of computers. The computing device described below and its components, including their connections, relationships, and functions, is meant to be exemplary only, and not meant to limit implementations of the disclosed technologies described in this specification. Other computing devices suitable for implementing the disclosed technologies may have different components, including components with different connections, relationships, and functions.

Basic Computing Device

Turning now to FIG. 1, it is a block diagram of a basic computing device 100 suitable for implementing the disclosed technologies in accordance with some embodiments of the invention. Computing device 100 includes bus 102 or other communication mechanism for addressing main memory 106 and for transferring data between and among the various components of device 100. Computing device 100 also includes hardware processor 104 coupled with bus 102 for processing information. Hardware processor 104 may be a general purpose microprocessor, a system on a chip (SoC), or other processor suitable for implementing the described technologies.

Main memory 106, such as a random access memory (RAM) or other dynamic storage device, is coupled to bus 102 for storing information and instructions to be executed by processor 104. Main memory 106 also may be used for storing temporary variables or other intermediate information during execution of instructions to be executed by processor 104. Such instructions, when stored in non-transitory storage media accessible to processor 104, render computing device 100 into a special-purpose computing device that is customized to perform the operations specified in the instructions.

Computing device 100 further includes read only memory (ROM) 108 or other static storage device coupled to bus 102 for storing static information and instructions for processor 104.

Mass storage device 110 is coupled to bus 102 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, mass storage devices 110 (e.g., the main hard disk for the device) stores a body of program and data for directing operation of the computing device, including an operating system, user application programs, driver and other support files, as well as other data files of all sorts.

Computing device 100 may be coupled via bus 102 to display 112, such as a liquid crystal display (LCD) or other electronic visual display, for displaying information to a computer user. Display 112 may also be a touch-sensitive display for communicating touch gesture (e.g., finger or stylus) input to processor 104.

An input device 114, including alphanumeric and other keys, is coupled to bus 102 for communicating information and command selections to processor 104.

Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computing device 100 may implement the methods described herein using customized hard-wired logic, one or more application-specific integrated circuits (ASICs), one or more field-programmable gate arrays (FPGAs), firmware, or program logic which, in combination with the computing device, causes or programs computing device 100 to be a special-purpose machine.

Methods disclosed herein may also be performed by computing device 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computing device 100 also includes communication interface 118 coupled to bus 102. Communication interface 118 provides a two-way data communication coupling to wired or wireless network link 120 that is connected to local network 122 (e.g., Ethernet network, Wireless Local Area Network, cellular phone network, Bluetooth wireless network, or the like). Communication interface 118 sends and receives electrical, electromagnetic, or optical signals that carry digital data streams representing various types of information. For example, communication interface 118 may be a wired network interface card, a wireless network interface card with an integrated radio antenna, or a modem (e.g., ISDN, DSL, or cable modem).

Network link 120 typically provide data communication through one or more networks to other data devices. For example, network link 120 may provide a connection through local network 122 to host computer 124 or to data equipment operated by Internet Service Provider (ISP) 126. ISP 126 in turn provides data communication services through the world wide packet data communication network now commonly referred to as the "Internet" 128. Local network 122 and Internet 128 use electrical, electromagnetic or optical signals that carry digital data streams. The signals through the various networks and the signals on network link 120 and through communication interface 118, which carry the digital data to and from computing device 100, are example forms of transmission media.

Computing device 100 can send messages and receive data, including program code, through local network 122, Internet 128, ISP 126, network link 120 and communication interface(s) 118. In the Internet example, server computer 130 might transmit a requested code for an application program through Internet 128, ISP 126, local network 122 and communication interface 118.

The received code may be executed by processor 104 as it is received, and/or stored in storage device 110, or other non-volatile storage for later execution.

Basic Software System

Figure 2:
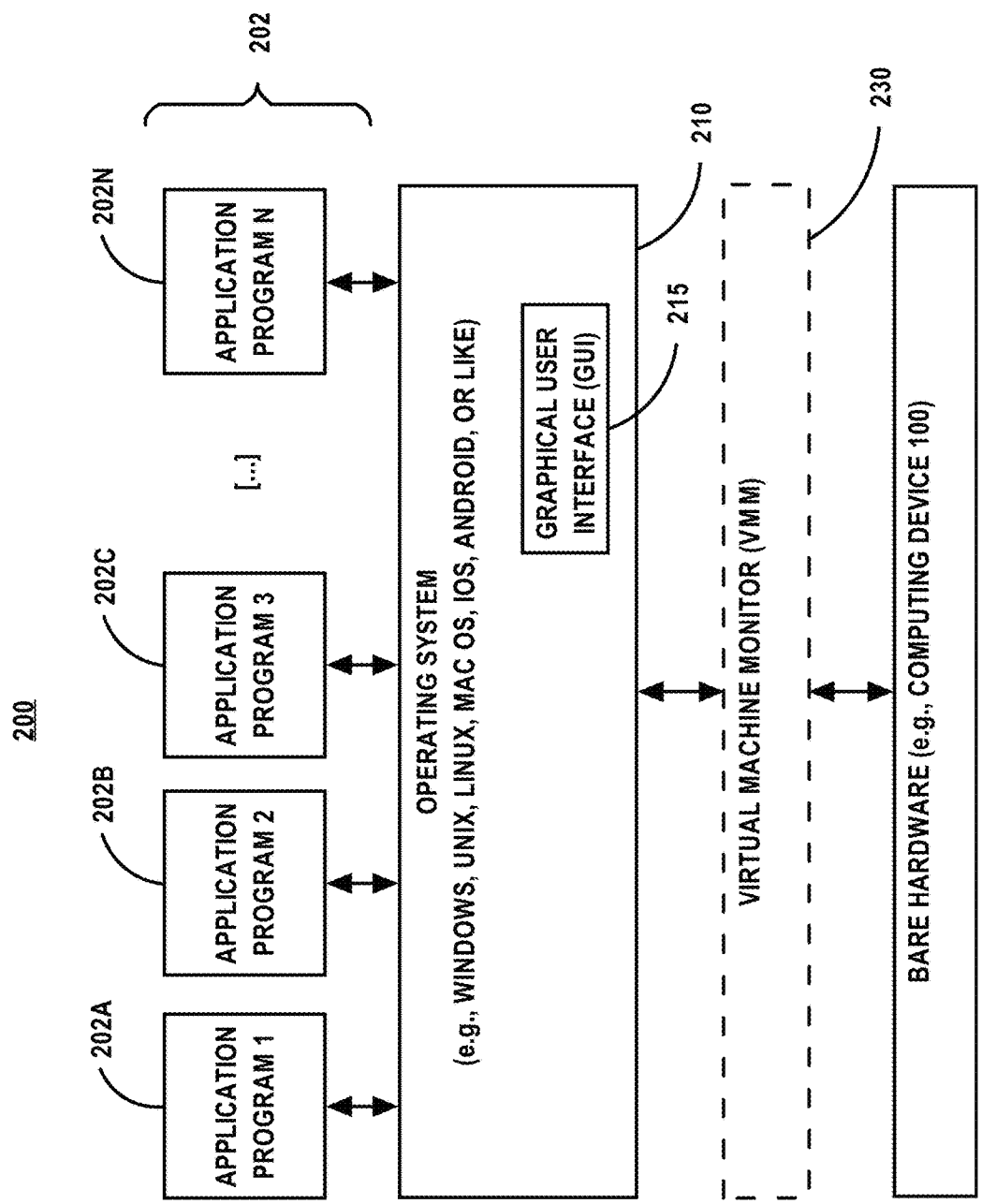
FIG. 2 is a block diagram of a basic software system for controlling the operation of the computing device in accordance with some embodiments of the invention.

Turning now to FIG. 2, it is a block diagram of a basic software system 200 for controlling the operation of computing device 100 in accordance with some embodiments of the invention. As shown, computer software system 200 is provided for directing the operation of computing device 100. Software system 200, which is stored in system memory (RAM) 106 and on fixed storage (e.g., hard disk) 110, includes kernel or operating system (OS) 210. OS 210 manages low-level aspects of computer operation, including managing execution of processes, memory allocation, file input and output (I/O), and device I/O. One or more application programs 202 (e.g., 202A, 202B, 202C . . . 202N) may be "loaded" (e.g., transferred from fixed storage 110 into memory 106) for execution by system 200. In some instances, application programs 202 or other software intended for use on device 100 may also be stored as a set of downloadable computer-executable instructions, for example, for downloading and installation from an Internet location (e.g., from a web server).

Software system 200 may include graphical user interface (GUI) 215, for receiving user commands and data in a graphical (e.g., "point-and-click" or "touch gesture") fashion. These inputs, in turn, may be acted upon by system 200 in accordance with instructions from operating system 210 and/or application programs 202. GUI 215 also serves to display the results of operation from OS 210 and application programs 202, whereupon the user may supply additional inputs or terminate the session (e.g., log off).

OS 210 can execute directly on the bare hardware (e.g., processor 104) of device 100. Alternatively, hypervisor or virtual machine monitor (VMM) 230 may be interposed between the bare hardware and OS 210. In this configuration, VMM 230 acts as a software "cushion" or virtualization layer between OS 210 and the bare hardware of device 100.

VMM 230, if present, instantiates and runs virtual machine instances ("guest machines"). Each guest machine includes a "guest" operating system, such as OS 210, and one or more application programs, such as application programs 202, designed to execute on the guest operating system. VMM 230 presents the guest operating systems with a virtual operating platform and manages the execution of the guest operating systems. In some instances, VMM 230 may allow a guest operating system to run as through it is running on the bare hardware of device 100 directly. In these instances, the same version of the guest operating system configured to execute on the bare hardware directly may also be able to execute on VMM 230 without modification or reconfiguration. In other words, VMM 230 may provide full hardware and CPU virtualization to a guest operating system in some instances. In other instances, a guest operating system may be specially designed or configured to execute on VMM 230 for efficiency. In these instances, the guest operating system is "aware" that it executes on a virtual machine monitor. In other words, VMM 230 may provide para-virtualization to a guest operating system in some instances.

The above-described computer hardware and software are presented for purpose of illustrating basic underlying computer components that may be employed for implementing the disclosed technologies. The disclosed technologies, however, are not limited to any particular computing environment or computing device configuration. Instead, the disclosed technologies may be implemented in any type of system architecture or processing environment capable of supporting the disclosed technologies presented in detail below.

Client/Server Multi-User Search System Components

Figure 3:
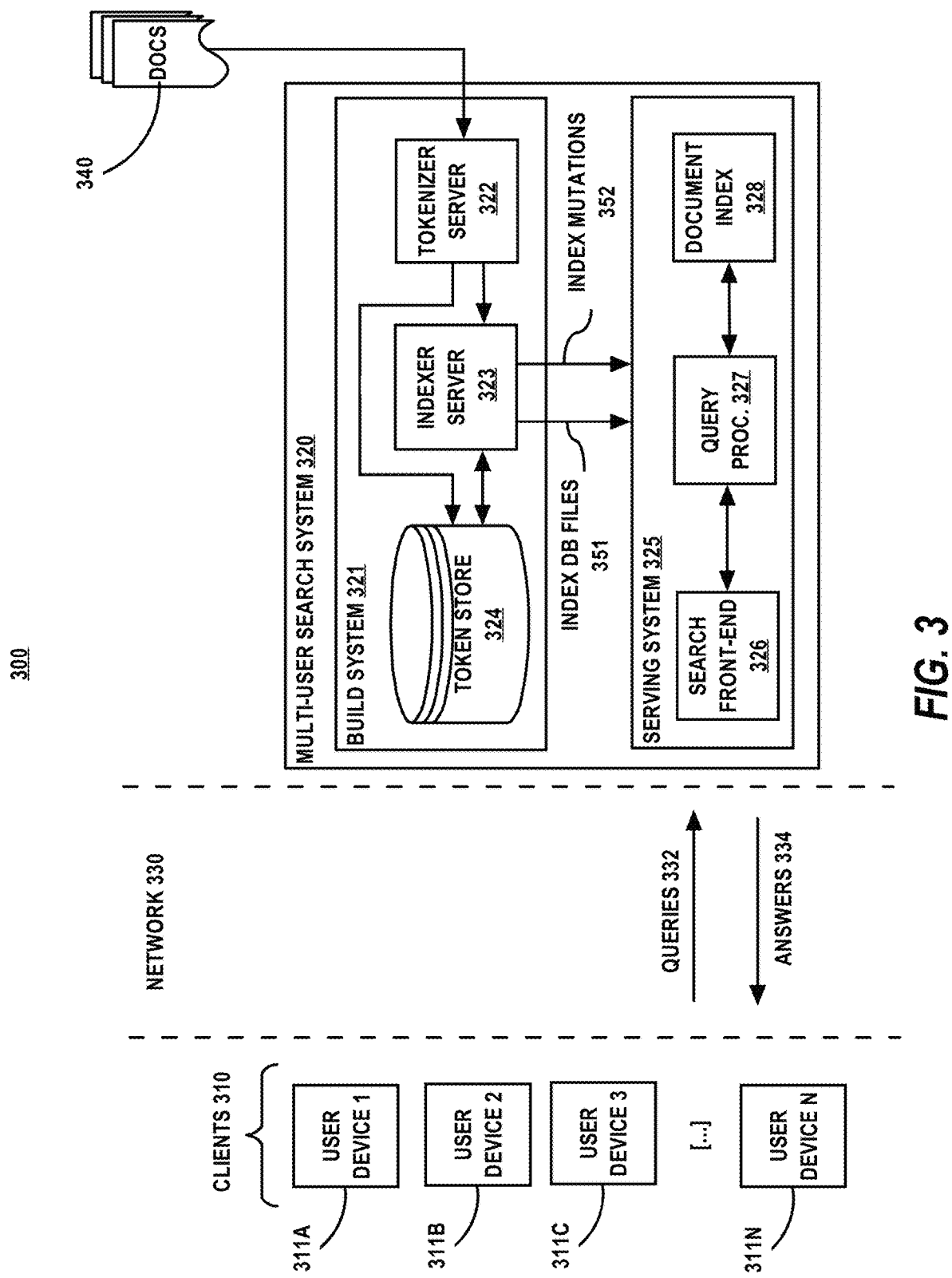
FIG. 3 is a block diagram of a client/server system including a multi-user search system in accordance with some embodiments of the invention.

Turning now to FIG. 3, it is a block diagram of a client/server system 300 in accordance with some embodiments of the invention. The client/server system 300 includes one or more servers 320 (collectively referred to herein as "multi-user search system 320"). Also, client/server system 300 includes one or more clients 310 connected to one or more servers 325 (collectively referred to herein as "serving system 325") via network 330. Specifically, clients 310 comprise one or more end-user computing devices 311 connected to one or more servers 326 (collectively referred to herein as "search front-end 326") using a conventional network. In an exemplary embodiment, end-user computing devices 311 may themselves comprise a plurality of end-user personal computing devices such as the above-described device 100 that run a conventional operating system such as MICROSOFT WINDOWS (e.g. XP, VISTA, 7, 8, etc.), MAC OS X, LINUX (e.g., UBUNTU, FEDORA, etc.), IOS, ANDROID, BLACKBERRY OS, and the like.

Serving system 325 and one or more other servers 321 (collectively referred to herein as "build system 321"), which are part of the aforementioned DROPBOX content management service in an exemplary embodiment, generally operate as one or more independent processes (e.g., independent of the clients), running under a server operating system such as UNIX, LINUX, and the like. Build system 321 includes token store 324, indexer server 323 (or just "indexer 323"), and tokenizer 322 (or just "tokenizer 322"). In addition to search front-end 326, serving system 325 also includes query processor 327 and document index 328.

A server of multi-user search system 320, including a server of build system 321 and a server of serving system 325, may be implemented as a server computer (e.g., device 100 of FIG. 1) or as a virtual machine instance depending on the requirements of the particular implementation at hand. Where a server of multi-user search system 320 is implemented as a virtual machine instance there still may be an underlying server computer that hosts (executes) the "virtual" server. However, there is not necessarily a one-to-one correspondence between virtual servers and server computers. For example, a server computer can host multiple virtual servers.

As used in this description and the appended claims, the singular form "server" is intended to include the plural form as well unless the context clearly indicates otherwise. For example, a "server" of multi-user search system 320 may actually be implemented by multiple servers that are mirrors or replicas of each other for load balancing, failover, redundancy, high availability, and/or other purposes according to the requirements of the particular implementation at hand.

In operation, clients 310 send search queries 332 to search front-end 326 and receive query answers 334 thereto from search front-end 326. The queries 332 may be received at search front-end 326 in network requests and the answers 334 sent from search front-end 326 in network responses to the network requests. The network requests and the network responses may be received/sent over network 330 in network data packets. In some embodiments of the invention, the network data packets are formatted in accordance with the Internet Protocol (IP). The network requests and the network responses may also be received/sent in accordance with an application layer networking protocol. In some embodiments, the application layer networking protocol is the Hyper Text Transfer Protocol (HTTP) or the Secure Hyper Text Transfer Protocol (HTTPS). For example, query 332 may be received in one or more HTTP or HTTPS requests and answer 334 sent in one or more HTTP or HTTPS responses thereto.

Network 330 may include a number of conventional wired or wireless network systems including, for instance, a cellular telephone network, a Local Area Network (LAN), a Wide Area Network (WAN), the Internet, and the like. Serving system 325 and build system 321, and the servers thereof, may also be interconnected by one or more IP networks and/or other suitable type of data communications network and may also communicate with each other using HTTP and/or HTTPS and/or other suitable application layer protocol.

A search query 332 may comprise a search expression. The syntax of the search expression may include a sequence of one or more query tokens, possibly related together by one or more Boolean operators (e.g., AND, OR, NOT, etc.). A token may be defined as a sequence of one or more characters. A character in a token may be encoded according to a conventional character encoding scheme (e.g., ASCII, UTF-8, and the like)

A query token may be defined as a token that appears in a search query 332. For example, consider the simple conjunctive query 332: [baguette fromage] (without the enclosing brackets). A document 340 satisfying this query 332 may contain both the token "baguette" and the token "fromage" without necessarily being next to each other in the document 340 and without the token "baguette" necessarily appearing before the token "fromage" in the document 340. However, a document 340 that contains or is associated with the tokens "baguette" and "fromage" near each other and with the token "baguette" before the token "fromage" may be considered more relevant than other documents 340 satisfying the query 332.

A query answer 334 to a search query 332 returned from search front-end 326 to a client (e.g., end-user computing device 311A) may comprise a list search answer summaries ordered by relevance. Each such summary may correspond to a document 340 identified by query processor 327 in document index 328 satisfying the search query 332. A search answer summary may include, for example, an identifier (e.g., a name, a title, etc.) of the corresponding document, a short description (e.g., a synopsis, abstract, extract, snippet, etc.) of the corresponding document, an interactive hyperlink (e.g., a Uniform Resource Locator (URL)) for downloading, viewing, or taking some other user action on the corresponding document, and possibly other useful information about the corresponding document 340 (e.g., a thumbnail image of the corresponding document). The list of summaries may be presented to a user of the end-user computing device, for example, on a web page in a web browser application executing on the end-user computing device or, for instance, in another graphical user interface of an application (e.g., a mobile application) executing on the end-user computing device.

Search queries 332 received at search front-end 326 may be processed by query processor 327. Query processor 327 may consult document index 328 to identify documents satisfying search queries 332. References to (e.g., hyperlinks to) documents identified by query processor 327 satisfying search queries 332 may be returned in answers 334. A technique in some embodiments of the invention performed by query processor 327 for processing queries 332 may be as described in greater detail below.

In some cases, a search query 332 is a "completion" search query 332. A completion search query 332 may be defined as a search query 332 including a sequence of one or more query tokens one of which is not complete. For example, a completion search query 332 may be submitted to search front-end 326 from an end-user computing device (e.g., 311A) when the user of the end-user computing device is in the middle of (e.g., in the process of) entering (e.g., by typing) one of the query tokens of the completion search query 332. In this case, an answer 334 to the completion query 332 may comprise a list of possible completions to the completion search query 332 that query processor 327 identifies in document index 328 based on the completion query 332.

The query tokens in a completion query 332 which are complete are referred to herein as "complete tokens". A query token in the completion query 332 which is not complete is referred to herein as a "completion token". Thus, a completion query may also be defined as a query 332 that includes a completion token.

A completion query 332 may comprise just a single character or more than one character. For example, in the completion query 332 [p] (without enclosing brackets), there may be no complete tokens and the token "p" may be a completion token. A completion query 332 may instead comprise one or more complete tokens. For example, in the completion query 332 [private se] (without enclosing brackets), the token "private" may be a complete token and the token "se" may be a completion token.

Typically, the last token in the sequence of tokens of a completion query 332 (or the only token if there is only one token in the sequence) is a completion token. Often, this is because the user enters the tokens of the competition query 332 in the same order they appear in the sequence. However, a token other than the last token of a completion query 332 can be a completion token. For example, the user may move the input cursor at his or her end-user computing device (e.g., 311A) to edit a previously entered token. For example, the user may enter the query 332 [solved two problems] (without enclosing brackets) at a first time. Later, the user may move the input cursor to replace the token "two" with "th" to generate the completion query [solved th problems]. In this example completion query 332, the first token "solved" and the last token "problems" may be the complete tokens and the second token "th" may be the completion token.

In some embodiments of the invention, a query 332 is designated as a completion query 332 in a network request including query 332. For example, the network request may indicate that a query token of query 332 is a completion token. Identification of the completion token may be made by software executing at the user's end-user computing device (e.g., 311A). For example, the software may send the network request including query 332 to search front-end 326 as the user is entering (e.g., with a physical keyboard or soft keyboard) the characters of a token of query 332 into a search user interface presented at the user's end-user computing device. In doing so, the software may flag, mark, identify, or otherwise indicate in the network request (e.g., with metadata) that the token the user is entering is a completion token. In some embodiments of the invention, the software executing at the user's end-user computing device is JAVASCRIPT software or other web browser client side scripting language software and the search user interface is presented on a web page displayed in a window of the user's web browser. In some embodiments of the invention, the software executing at the user's end-user computing device is a mobile application or other dedicated software application that drives the search user interface at the user's end-user computing device.

A possible completion to a completion search query 332 may be defined as a search query 332 that is satisfied by at least one document 340 indexed by document index 328 and that completes the completion query 332. For example, the search query 332 [solved two problems] (no enclosing brackets) satisfied by at least one document 340 indexed by document index 328 may be a possible completion to the completion search query 332 [solved two prob] (without enclosing brackets). The list of possible completions to the completion query 332 may be provided in the answer 334 in addition to or instead of a list of search answer summaries of documents 340 that satisfy the completion query 332. A technique in some embodiments of the invention employed by query processor 327 for processing completion queries 332 may be as described in greater detail below.

A query 332 that is not a completion query 332 may sometimes be referred to herein as a "non-completion" query 332 to distinguish the query 332 from a completion query 332. A non-completion query 332 may also be defined as a query 332 that contains only complete tokens and does not contain any completion tokens. When referring to a query 332 generally, reference may be made herein to "query 332" or "search query 332" without the preceding "completion" or "non-completion" qualifier. Unless otherwise clearly apparent in context, description herein pertaining to queries 332 generally pertains to both completion queries 332 and non-completion queries 332.

A document 340 may be defined as a collection of digital information that contains text content (e.g., character data) and/or is associated with text content (e.g., textual metadata). As just some examples, a word processing document 340 often contains text context (e.g., the authored words and sentences of the document), a spreadsheet document 340 may contain text context in the form of words and numbers, and a digital image document 340 (e.g., a digital photograph) may contain text content in its header (e.g., in Exchangeable image file format (Exif)). In addition or alternatively, a digital image document 340 may be associated with text content in the form of textual metadata tags or other text description of the image content. These are just some examples of possible types of documents and other types of documents are within the scope of invention.

In some instances, a document 340 corresponds to a file having a file type. Some types of files that can be documents include, but are not limited to, image files (e.g., .jpg, .tiff, .gif), music files (e.g., .mp3, .aiff, .m4a. wav), movie files (e.g., .mov, .mp4, .m4v), word processing files (e.g., .doc, .docx, .pages), presentation files (e.g., .ppt, .pptx, .key), spreadsheet files (e.g., .xls., .xlsx, .numbers), web page files (e.g., .htm, .html), text files (e.g., .txt), and any other type of file that contains and/or is associated with text.

A document 340 can be associated with text context that is descriptive of the document content. This associated text content is sometimes referred to as "textual metadata" for the document. For example, the filename of a document 340 can be textual metadata for the document 340. As another example, textual metadata for a digital image document may be produced by a computer analysis of the image (e.g., optical character recognition (OCR), facial recognition algorithms, etc.). Other forms of textual metadata for a document 340 can include, for instance, text content about the document 340 obtained from a web page that references the document 340 (e.g., by a hyperlink), mentions the document 340 (e.g., in a social networking post), or discusses the document 340 (e.g., in a blog and/or user comments post). For purposes of this description, textual metadata for a document 340 may be considered to be part of and contained (occurring) in the text content of the document 340.

A document 340 may also have multiple versions, one of which is considered the current version. For example, a user may create and save a first version of a word processing document 340 using a word processing program. Sometime later, the user may modify the first version of the document 340 and save a second version of the document 340 containing the modifications. Alternatively, a document 340 may have only one version at a time which is considered the current version.

Document index 328 may comprise one or more dictionary and postings pairs. The dictionary of a pair may store index tokens, and may also comprise a pointer to a postings list in the postings of the pair for each index token. For example, the pointer may be an address of a location in volatile or non-volatile memory where the postings list is stored.

An index token may be defined as a token by which a document 340 is indexed in document index 328. In addition to index tokens, a dictionary may store token attributes for an index token such as, for example, the document frequency of the token. Token attributes for index tokens may be used by query processor 327 to improve query processing efficiency and search result ranking.

A postings list for an index token may store a list of one or more document identifiers of one or more documents 340 in which the token occurs, and may also store document-token attributes for a document 340 identified in the postings list such as, for instance, the frequency of the token in the document 340, or the position(s) of the token within the document 340. Document-token attributes for documents 340 in postings lists may also be used by query processor 327 to improve query processing efficiency and search result ranking.

When processing a query 332, query processor 327 may locate index tokens in a dictionary of document index 328 based on the query tokens in the query 332. For example, for a query 332 such as [solved two problems] (without the enclosing brackets), query processor 327 may locate the index tokens "solved", "two", and "problems" in the dictionary. Query processor 327 may retrieve postings lists for located index tokens using the pointers associated with the located index tokens in the dictionary. For example, query processor 327 may retrieve (e.g., load into RAM) from a postings of document index 328 associated with the dictionary postings lists for the index tokens "solved", "two", and "problems".

Query processor 327 may merge retrieved postings lists using a merge algorithm to identify documents 340 that satisfy the query 332. For example, assume the postings list retrieved for the index token "solved" identifies documents D2 and D3, the postings list retrieved for the index token "two" identifies document D2, and the postings list retrieved for the index token "problems" identifies documents D2 and D3. Query processor 327 may then merge these three postings lists according to a merge algorithm to identify document D2 as containing all of the located index tokens. Various different merge algorithms may be used for merging postings lists and the invention is not limited to any particular merge algorithm. For example, the merge algorithm may combine multiple postings lists by interleaved advancing of pointers through each of the multiple postings lists.

Query processor 327 is not limited to processing only simple conjunctive queries 332 and query processor 327 may process more complex queries 332. For example, query processor 327 may process the following example types of queries 332: Query A:[(two or three) NOT problems], Query B:[two three problems], Query C:[(two three) problems], and Query D:[(two OR three) (problems OR solutions)]. In each of the foregoing example queries 332 within enclosing brackets [ ], the enclosing brackets [ ] are not part of the query. Query A is equivalent to the query 332 [(two or three) AND NOT problems], Query B is equivalent to the Boolean query 332 [two AND three AND problems], Query C equivalent to the Boolean query 332 [(two AND three) AND problems], and Query D equivalent to the Boolean query 332 [(two OR three) AND (problems OR solutions). In the foregoing example queries 332, AND OR NOT ( ) are Boolean operators.

In some embodiments of the invention, document index 328 is horizontally partitioned (e.g., sharded) across a plurality of index severs of serving system 325 in which each of the index servers stores a portion (e.g., a shard) of document index 328. Various different techniques may be used to horizontally partition (e.g., shard) index 328 across the index servers. In some embodiments of the invention, document index 328 is sharded by "document namespace".

A document namespace may be defined as a collection of one or more documents 340 under common access control. The common access control can be based on explicit and/or implicit permissions specifying and/or indicating which user(s) and/or group(s) of users have access to the documents 340 in the document namespace and what access (e.g., one or more of read access, write access, share access, preview access, download access, etc.) the user(s) and/or group(s) of users have on the documents 340 that belong to the document namespace. Explicit permissions may come in the form of, for example, one or more access control lists (ACLs) and/or other data associated with the document namespace (or an identifier thereof) specifying and/or indicating which user(s) and/or group(s) of users have access to the documents 340 in the document namespace and what access the user(s) and/or group(s) have on the documents 340 in the document namespace. One example of an implicit permission may be: a user has access to all documents 340 in a document namespace associated with an account (or an identifier thereof) of the user.

In an exemplary embodiment, a document namespace includes documents 340 associated with a user's account held with a cloud data storage service such as, for example, the aforementioned DROPBOX content management service. By successfully authenticating against the account (e.g., with a valid username/password), a user implicitly has access to the documents 340 in the document namespace associated with the user's account.

In an exemplary embodiment, a document namespace includes documents 340 belonging to a collection of one or more documents 340 that is shared among multiple user accounts held with a cloud data storage service such as, for example, the aforementioned DROPBOX content management service. In some instances, the collection of documents may be referred to as a "shared folder". By successfully authenticating against an account with which the collection of documents is shared with, a user has access to the documents in the shared document namespace.

According to some embodiments of the invention in which document index 328 is sharded by document namespace, each of a plurality of index servers of serving system 325 indexes documents 340 belonging to one or more document namespaces. In some embodiments of the invention, an identifier of a document namespace is used as the shard key to determine an index server that indexes documents 340 in the document namespace. In a non-limiting exemplary embodiment, document index 328 indexes documents in over four-hundred million (400,000,000) document namespaces.

Documents 340 may include any document 340 that is provided or made available for processing by build system 321 or that is indexed in document index 328. Build system 321 constructs index database files 351 of document index 328 from documents 340. Build system 321 also generates index mutations 352 to document index 328 from documents 340.

An index database file 351 may comprise a dictionary and postings pair that together index one or more documents 340. Very generally, the data within an index database file 351 may be structured as a collection of key-value pairs (e.g., an associative array) in which the keys correspond to the index tokens of the dictionary and the values corresponding to the postings lists of the postings. In some embodiments of the invention, an index database file 351 indexes documents 340 in one document namespace. In some embodiments of the invention, to reduce the number of index database files 351 of document index 328, an index database file 351 indexes documents 340 in multiple document namespaces. The multiple document namespaces indexed by an index database file 351 is sometimes referred to herein as a "document namespace group" of document namespaces.

Constructing index database files 351 of document index 328 by build system 321 may involve tokenizer 322 generating sets of tokens by tokenizing documents 340 and storing the generated sets of tokens in token store 324. Indexer 323 may then generate index database files 351 based on the generated sets of tokens. Indexer 323 provides generated index database files 351 to serving system 325 for storage on index servers of serving system 325 as part of document index 328. A technique in some embodiments of the invention implemented by build system 321 for constructing index database files 351 of document index 328 from documents 340 may be as described in U.S. non-provisional patent application Ser. No. 14/555,180, filed Nov. 26, 2014, the entire contents of which is hereby incorporated by reference.

Generating index mutations 352 to document index 328 from documents 340 by build system 321 may involve tokenizer 322 notifying indexer 323 after generating a set of tokens from a recently created or recently modified document 340. For example, the document 340 may have been recently created or recently modified by a user of an end-user computing device 311. When notified of a recently created document 340 or when notified of an modified document 340, indexer 323 generates an index mutation 352 for the document based on one or more sets of tokens stored for the document in token store 324. In some instances such as, for instance, when the document has been modified, the generated index mutation 352 reflects the differences between the set of tokens generated for the modified document and a set of tokens generated for a previous version of the document. The generated index mutation 352 may be provided to serving system 325 which then applies it document index 328. A technique in some embodiments of the invention implemented by build system 321 for generating index mutations 352 to document index 328 from recently created and modified documents 340 may be as described in U.S. non-provisional patent application Ser. No. 14/555,140, filed Nov. 26, 2014, the entire contents of which is hereby incorporated by reference.

Tokenizer 322 produces sets of tokens by tokenizing the text content of documents 340. Tokenizing the text content of a document may include obtaining a character sequence of the document. Various techniques may be used by tokenizer 322 to obtain the character sequence of the document depending on the format of the document data. For example, the technique or techniques used may include decoding the document depending on the character encoding scheme of the document (e.g., ASCII, Unicode UTF-8, MICROSOFT WORD, ADOBE PDF, etc.) and/or uncompressing the document depending on whether the document is compressed (e.g., by ZIP compression).

Once the character sequence of the document is obtained, tokenizer 322 divides the character sequence into pieces, called tokens, possibly performing linguistic processing on tokens at the same time. Linguistic processing may include, for instance, ignoring certain characters (e.g., punctuation), dropping common words (e.g., stop words), and/or stemming and lemmatization. Linguistic processing may also include token normalization including removing diacritics and accents and/or capitalization/case-folding, and the like.

After tokenizer 322 has generated a set of tokens for a document, tokenizer 322 stores the set of tokens in token store 324. In some instances such as, for example, when tokenizer 322 notifies indexer 323 of a recently created document 340 or notifies indexer 323 of a recently modified document 340, tokenizer 322 may also provide the set of tokens to indexer 323.

Token store 324 stores sets of tokens generated for documents 340 by tokenizer 322. For example, for a given version of a document 340, token store 324 may store the set of tokens generated by tokenizer 322 for that document version.

In some embodiments of the invention, token store 324 includes a column-oriented, distributed database system such as, for example, the APACHE HBASE database system. However, other types of database systems may be used in other embodiments according to the requirements of the particular implemented at hand. For example, a proprietary, a relational, or a stand-alone database system may be used instead of an open source, a column-oriented, or a distributed one.

With the above exemplary client-server multi-user search system 320 in mind, the serving system 325 and components thereof used for processing queries 332 and returning personalized answers 334 thereto will now be described in greater detail.

Serving System Components

Figure 4:
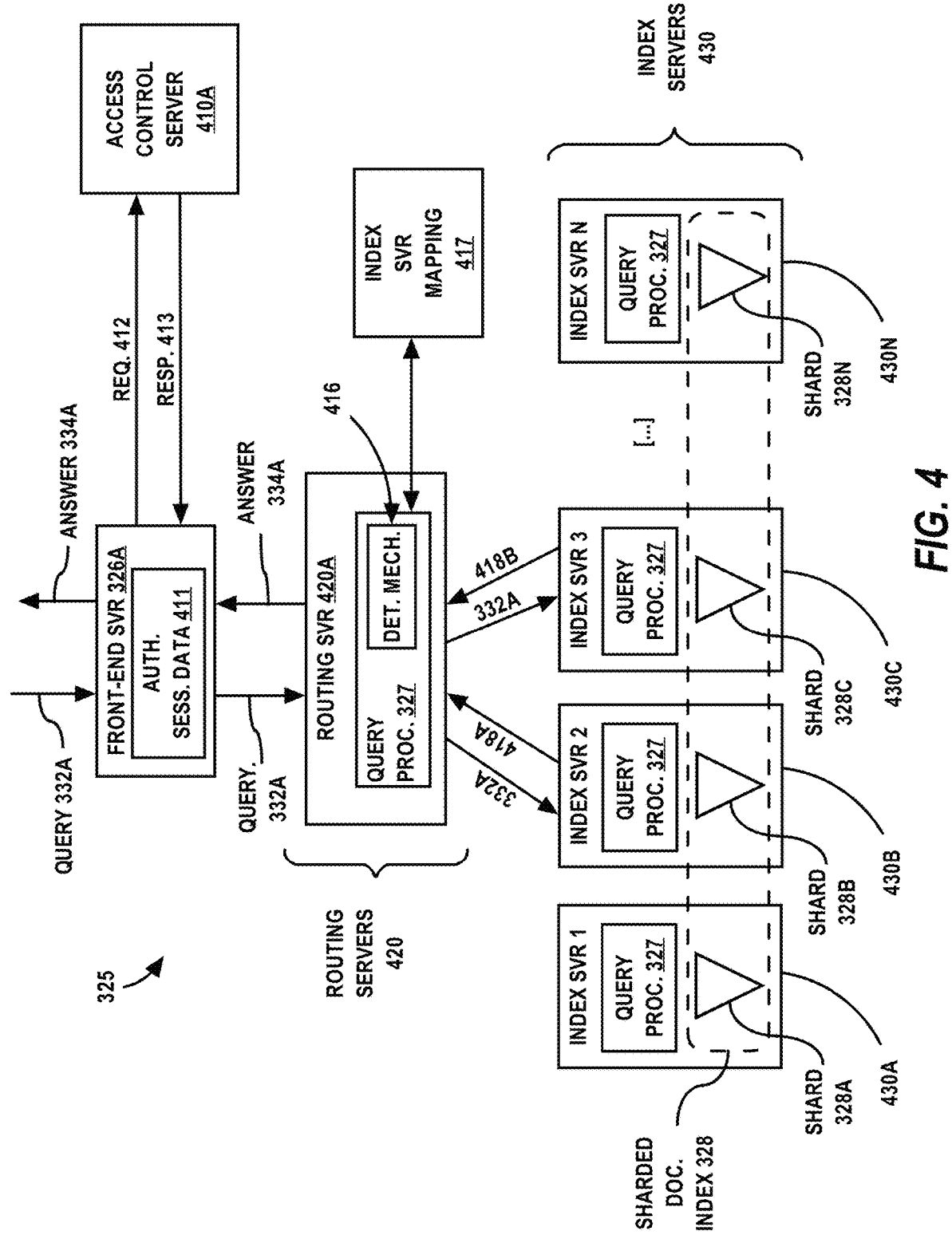
FIG. 4 is a block diagram of a serving system of a multi-user search system in accordance with some embodiments of the invention.

Turning now to FIG. 4, it is a block diagram illustrating components of serving system 325 in greater detail in accordance with some embodiments of the invention. Serving system 325 includes one or more servers 326 (collectively referred to herein as "front-end servers 326"), one or more servers 410 (collectively referred to herein as "access control servers 410"), and query processor 327.

Query processor 327 is distributed over two-levels of servers: (1) one or more servers 430 (collectively referred to as "index servers 430") responsible for storing document index 328 and processing queries 332 against index shards (e.g., 328A, 328B, 328C . . . 328N) of document index 328 and (2) one or more servers 430 (collectively referred to as "routing servers 420") responsible for routing queries 332 from front-end servers 326 to the appropriate index servers 430 based on document namespace identifiers associated with the queries 332 and combining answers 418 returned from index servers 430 into answers 334 that are then returned to the front-end servers 326 and ultimately to the end-user computing devices 311.

Each index shard (e.g., 328A, 328B, 328C . . . 328N) of document index 328 may be stored at a corresponding index server (e.g., 430A, 430B, 430C . . . 430N). An index shard (e.g., 328B) at an index server (430B) may index documents 340 in one or more document namespaces assigned to the index shard.

In operation, front-end server 326A receives a search query 332A from an end-user computing device (e.g., 311A) and returns a personalized answer 334A thereto back to the end-user computing device. The answer 334A may be personalized in the sense that the documents 340 identified in the answer 334 as relevant to the query 332A may be restricted to only documents 340 that belong to a document namespace that the user is authorized to access. If the query 332A is a completion query, then the answer 334A may also be personalized in the sense that the possible completions to the completion query included in the answer 334 may be composed of only index tokens in document index 328 that index documents 340 that belong to a document namespace the user is authorized to access. The user may be authenticated to facilitate the personalization of the answer 334A.

As such, the query 332A may be received at front-end search 326A in the context of an authentication session established for an authenticated user. For example, the authenticated user may be a user of the end-user computing device that sent query 332A to front-end server 326A. The authenticated user may have been authenticated prior to front-end server 326A receiving query 332A. For example, the authenticated user may have been authenticated in response to receiving an authentication network request from the end-user computing device that contained authentication credentials (e.g., a username/password pair). In response to receiving the authentication network request, the password in the network request may be compared to a known password for the given username. If the passwords match, then an authentication session is established. Otherwise, if the passwords do not match, then no authentication session is established.

Authentication credentials other than a username/password pair may be used to authenticate the user. For example, in some instances, the user may be authenticated according to a multi-factor authentication technique. For example, in addition to something that the user knows (e.g., a username/password pair), the user may be authenticated based on something the user has in his or her possession (e.g., a FOB or a mobile phone) and/or based on something the user is (e.g., a biometric measurement). In some instances, the user may be authenticated according to an authentication protocol that does not require the user to provide a password. Some example authentication protocols suitable for this purpose include the Open Authorization (OAuth), the OpenId, and the Security Assertion Markup Language (SAML) authentication protocols.

While in some instances, the user is authenticated prior to front-end server 326A receiving query 332A, the user is authenticated in response to receiving query 332A in other embodiments. For example, the network request containing query 332A may also contain authentication credentials for authenticating the user, or the user can otherwise be authenticated in response to receiving the network request containing the query 332A.

After the user is authenticated, an authentication session may be established for the user in the form of a session identifier token. In particular, the session identifier token may be created in response to successfully authenticating the user. After creation, the session identifier token may be sent (e.g., in a "cookie") between the user's end-user computing device and front-end server 326A in network requests and network responses including in a network request containing query 332A and in a network response containing answer 334A. The session identifier token identifies, directly or indirectly (e.g., through an associative array), a user account that the user successfully authenticated against (e.g., an account uniquely identified by a username). The session identifier token may be cryptographically encrypted for extra security.

From time to time (e.g., in response to receiving query 332A) or over a period of time (e.g., from a time the user is authenticated until the answer 334A is returned to the user's end user computing device), authentication session data 411 may be stored in volatile or non-volatile memory of front-end server 326A. Authentication session data 411 may include information pertaining to the authenticated user such as the authenticated user's username, user identifier, or other user account identifier and associated privileges, permissions, and/or authorizations.

Serving system 325 is capable of restricting the answer 334A to the query 332A to identifying only documents 340 indexed in document index 328 that satisfy the query 332A and that belong to a document namespace that the authenticated user is authorized to access. Serving system 325 is able to do this restricting even though document index 328 may index documents 340 that satisfy the query 332A but that belong to a document namespace that the authenticated user is not authorized to access.

To restrict the answer 334A to the query 332A, the front-end server 326A may send a network request 412 to access control server 410A requesting identifier(s) of document namespace(s) the authenticated user is permitted to access. To facilitate this determination by access control server 410A, network request 412 may contain an indication or identifier of the authenticated user. For example, the indication or identifier can be a username, a session identifier token, a user account identifier, or other information that uniquely identifies the user and/or the user account the user successfully authenticated against.

In response to receiving network request 412, access control server 410A can lookup in a user account database (not shown in FIG. 4) identifier(s) of document namespace(s) the authenticated user is permitted to access using as a key in the lookup operation the indication or identifier of the authenticated user provided in the request 412.

Front-end server 326A may send network request 412 to access control server 410A at various different times, For example, front-end server 426A may send network request 412 in response to receiving query 332A. As another example, front-end server 426A may send network request 412 after successfully authenticating the user.

In response to receiving network request 412, access control server 410A returns a network response 413 including identifier(s) of authorized document namespace(s) the authenticated user is permitted to access. Each of the authorized document namespace identifiers uniquely identifies a document namespace the authenticated user is permitted to access at some access level according to explicit and/or implicit access controls on the document namespace. For example, an authorized document namespace identifier may identify a document namespace for which the authenticated user has at least read access to documents 340 belonging to the document namespace. For efficiency in processing subsequent network requests, front-end server 326A may store (cache) authorized document namespace identifier(s) as part of authentication session data 411 maintained for the authenticated user. In this case, it may not be necessary for front-end server 326A to send network request 412 to access control server 410A in response to receiving query 332A.

The network request including query 332A from the user's end-user computing device may also specify identifier(s) of document namespace(s) that the user wishes to search. In this case, an intersection of the set of identifier(s) of document namespace(s) that the user wishes to search and the set of identifier(s) of authorized document namespace(s) the user is permitted to access may be computed to determine identifier(s) of authorized document namespace(s) to search. This intersection may be performed by front-end server 326A. Alternatively, this intersection may be performed by access control server 410A. In this case, front-end server 326A may include identifier(s) of document namespace(s) that the user wishes to search in the network request 412 and the network response 413 thereto may include the result of the intersection as computed by access control server 410A.

If the network request including query 332A does not specific any requested document namespaces to search, then a default set of identifier(s) of authorized document namespace(s) to search may be selected. The selection of the default set can be performed by front-end server 326A from the identifier(s) of authorized document namespace(s) returned in response 413 or cached as part of authentication session data 411 as the case may be. Alternatively, access control server 410A may select the default set from the set of all document namespaces the user is permitted to access. In either case, the default set can identify a) all document namespaces the user is permitted to access (e.g., all document namespaces associated with the authenticated user's account), or b) a subset thereof.

After the identifier(s) of authorized document namespace(s) to search have been determined, a network request including the query 332A and the identifier(s) of authorized document namespace(s) to search may be sent from front-end server 326A to a routing server 420A for further processing of query 332A by query processor 327.

In response to receiving the network request from front-end server 326A including the query 332A and the identifier(s) of the authorized document namespace(s) to search, query processor 327 at routing server 420A determines one or more index servers 430 to which to route the query 332A. This determination may be made based on results of routing server 420A applying deterministic mapping function 416 to each of the identifier(s) of the authorized document namespace(s) to search. The deterministic mapping function 416 and index server mapping 417, given an identifier of a document namespace, may be used by routing server (e.g., 420A) to determine an index server (e.g., 430B) that stores an index shard (e.g., 328B) that indexes documents in the given document namespace.

According to some embodiments of the invention, deterministic mapping function 416 applies a one-way hash function, a simple hash function, a consistent hash function, or the like to a document namespace identifier to search in order to determine an index shard (e.g., 328B) to which the document namespace is assigned. To make this determination, the query processor 327 at routing server 420A may have access to index server mapping 417. Together, deterministic mapping function 416 and index server mapping 417 provide a way for query processor 327 at routing server 420A to determine a hostname or a network address of an index server (e.g., 430B) at which an index shard (e.g., 328B) containing an index for a given document namespace is stored.

In some embodiments of the invention, deterministic mapping function 416 may include a hash mechanism and a modulo mechanism. Hash mechanism may accept a document namespace identifier as input (e.g., character string data representing the document namespace identifier) and may produce a hash value hv as output. For example, the hash mechanism may comprise the MD4, MD5, SHA-1, or SHA2 message-digest algorithm which, when applied to a document namespace identifier provided as input, produces a hash value (e.g., a 32-bit hash value) as output. The modulo mechanism may compute the remainder r of division of the hash value hv by a modulus k, thereby mapping the input document namespace identifier to one of k values in the range of 0 to k−1. The value of the modulus k may be selected based on a variety of different factors including, for example, the number of actual, expected, or desired index servers 430, the number of actual, expected, or desired document namespaces indexed by document index 328, and/or the number of actual, expected, or desired document namespaces groups. In one exemplary embodiment, the value k is a power of 2 and equals at least 1024.

In some embodiments of the invention, index server mapping 417 includes an entry for each of the index servers 430. Each such entry is keyed by one or more non-overlapping sub-ranges in the range 0 to k−1. For example, a first entry E1 in mapping 417 may have a key including the values K1 and K2 defining a first range of consecutive values in the range 0 to k−1 and a second entry E2 in mapping 417 may have a key including the values K3 and K4 defining a second range of consecutive values in the range 0 to k−1 where the first range K1 to K2 does not overlap the second range K3 to K4.

When query processor 327 at the routing server 420A applies deterministic mapping function 416 to a given document namespace identifier, a value r in the range 0 to k−1 may be produced. The query processor 327 at the routing server 420A may then consult index server mapping 417 with the value r to identify the entry for which r is within the range of the entry key. A hostname or network address of this entry may identify an index server (e.g., 430B) at which an index shard (e.g., 328B) that indexes documents 340 belonging to the given document namespace is stored.

In some embodiments of the invention, the document namespaces assigned to an index shard (e.g., 328B) are grouped into a fewer number of document namespace groups of the index shard so as to reduce the number of index files stored at the index server (e.g., 430B) at which the index shard is stored. In other words, within an index shared (e.g., 328B), the document namespaces assigned to the index shard may be partitioned into document namespace groups. Each such document namespace group may comprise multiple document namespaces.

For example, each of two million (2,000,000) document namespaces assigned to an index shard (e.g., 328B) may be partitioned into one of eighty (80) document namespace groups of the index shard. For efficiency, an index server (e.g., 430B) at which an index shard (e.g., 328B) is stored may store one or more index files for each of the eighty (80) document namespace groups instead of storing one or more index files for each of the two million (2,000,000) document namespaces. In this case, the hash value hv output by the hash mechanism when applied to a given document namespace identifier may be used as an identifier of the document namespace group to which the given document namespace belongs.

In some embodiments, document namespace groups are not used to further partition an index shard (e.g., 328B). In these embodiments, the remainder r of the division of the hash value hv by the modulus k may be used as the identifier of the index shard to which a given document namespace is assigned. Also in these embodiments, the index server at which the index shard is stored may store one or more index files for all document namespaces assigned to the index shard. For example, the index server may store a single index file for all document namespaces assigned to the index shard.

Although, in FIG. 4, the index server mapping 417 is shown separately from the deterministic mapping function 416 and the query processor 327 at the routing server 420A, the index server mapping 417 may be a component of the deterministic mapping function 416 or a component of the query processor 327 at routing server 420A. Further, each of the routing servers 420 may have access to the index server mapping 417. In this case, a copy of the index server mapping 417 may be stored (cached) at each of the routing servers 420 for efficient access. In addition or alternatively, the index server mapping 417 may be made available to routing servers 420 as a network service. Serving system 325 may comprise multiple routing servers 420 scaled in a horizontal fashion for load balancing, increased capacity, increased throughput, reduced latency, failover, and/or redundancy purposes.

In an exemplary embodiment, the document index 328 indexes documents 340 in over four-hundred million (400,000,000) document namespaces and the deterministic mapping function 416 and the index server mapping 417 assign (map) each of the over 400 million document namespaces to one of approximately two hundred (200) index shards (e.g., 328A, 328B, 328C . . . 328N). In this exemplary embodiment, each index shard (e.g., 328A) indexes documents 340 in approximately two million (2,000,000) document namespaces.

In some instances, an index server (e.g., 430C) actually includes a plurality of servers distributed in a horizontal fashion to provide load balancing, failover, or redundancy for an index shard (e.g., 328C). In this case, each of the multiple index servers may store a replica or a copy of the index shard (e.g., 328C).

In some instances, an index server (e.g., 430A) includes multiple servers in which each of the multiple servers stores a portion of an index shard (e.g., 328A). In this case, there may be multiple levels of routing servers. A first routing level is exemplified by the routing server 420A that routes the query 332A received from the front-end server 326A to one or more of the index servers 430. A second level of routing servers may exist to further route queries within an index server (e.g., 430C) to one or more of the multiple servers of the index server. In this case, the second level routing servers may also have a deterministic mapping function and mapping like deterministic mapping function 416 and index server mapping 417 for further routing the queries based on identifiers of document namespaces.

In the example of FIG. 4, the query 332A is routed by the routing server 420A according to the deterministic mapping function 416 and the index server mapping 417 to index servers 430B and 430C. However, the query 332A could just as easily been routed to just a single index server 430 or routed to more than two index servers 430, depending on the number of authorized document namespaces to search with the query 332A. For example, if there is only one authorized document namespace to search or if all of the authorized document namespaces to search are assigned to the same index shard (e.g., 328B), then the query 332A may have been routed by routing server 420A to just one index server (e.g., 430B).

When routing the query 332A to an index server (e.g., 430B), the routing server 420A may send a network request to the index server including the query 332A. In addition, the network request may comprise identifier(s) of authorized document namespace(s) to search assigned to an index shard (e.g., 328B) stored at that index server. In addition, each such authorized document namespace identifier may be associated in the network request with an identifier of the document namespace group to which the document namespace belongs.

In some embodiments of the invention, the query processor 327 at an index server (e.g., 430B) uses an identifier of a document namespace group in the network request received from the routing server 420A to limit the portion of an index shard (e.g., 328B) that is accessed when determining an answer (e.g., 418A) to the query 332A. For example, the query processor 327 at the index server may access only certain index database file(s) 351 stored in non-volatile memory at the index server or only certain data structures stored in volatile memory of the index server based on the document namespace group identifiers in the network request.

As an example, assume the network request including the query 332A sent from the front-end server 326A to the routing server 420A specifies that two authorized document namespaces are to be searched with corresponding document namespace identifiers "abcd" and "defg". Further assume that according to the deterministic mapping function 416 and the index server mapping 417, authorized document namespace "abcd" belongs to document namespace group "1234" and is assigned to index shard 328B and authorized document namespace "defg" belongs to document namespace group "5678" and is assigned to index shard 328C. In this case, the network request from the routing server 420A to the index server 430B may specify that document namespace "abcd" in document namespace group "1234" is to be searched and the network request from routing server 420A to index server 430C may specify that document namespace "defg" in document namespace group "5678" is to be searched. Index server 430B may use the document namespace group identifier "1234" in the network request sent to index server 430B to limit the portion of index shard 328B accessed by query processor 327 at index server 430B when formulating an answer 418A to the query 332A. Similarly, the index server 430C may use the document namespace group identifier "5678" in the network request sent to index server 430C to limit the portion of the index shard 328C accessed by the query processor 327 at index server 430C when formulating an answer 418B to the query 332A. Such limiting may include, for example, accessing only index database file(s) 351 stored in non-volatile memory of the index server and/or data in volatile memory of the index server associated with a specified document namespace group identifier.

The routing server 420A may route the query 332A to multiple index servers (e.g., 430B, 430C) so that the query processor 327 at each of the index servers 430 can process the query in parallel. For example, the routing server 420A may send a network request to index server 430B including query 332A at the same or roughly the same time as routing server 420A sends a network request to index server 430C including query 332A. In this case, the query processor 327 at index server 430B may process query 332A against index shard 328B at the same time or roughly the same time as the query processor 327 at index server 430C processes query 332A against index shard 328C.

When the query 332A is received at an index server (e.g., 430B), the query processor 327 at the index server may consult (access) the index shard (e.g., 328B) stored at the index server to determine documents 340 that satisfy the query. In doing so, the query processor 327 at the index server may restrict the documents 340 that can possibly be identified in an answer (e.g., 418A) to the query to only documents 340 that belong to an authorized document namespace to be searched. To do this restriction, the query processor 327 at the index server may use the authorized document namespace identifier(s) that accompanied the query 332A in the network request from the routing server 420A. In addition, document identifiers of documents 340 indexed in the index shard may be associated with the document namespace identifiers of the document namespaces to which the indexed documents 340 belong. These associations facilitate query processor 327 restricting documents 340 that can be identified in an answer to the query to those documents 1) that satisfy the query 332A and 2) that are associated with a document namespace identifier that is one of the authorized document namespace identifiers to be searched. Even if an indexed document 340 would otherwise satisfy the query, the query processor 327 at the index server may not identify the document 340 in an answer 418A to the query 332 if the document 340 does not belong to one of the authorized document namespaces to search.

An answer (e.g., 418A) from an index server (e.g., 430B) returned to a routing server (e.g., 420A) may identify one or more documents 340 in one or more of the authorized document namespaces that satisfy the query 332A. The documents may be ranked according to a ranking function employed by query processor 327 at the index server. The ranking function can be based on query-dependent metrics and/or query-independent metrics computed for indexed documents.

An answer (e.g., 418A) from an index server (e.g., 430B) to the query 332A may include a ranking score for each identified document generated by the ranking function. The query processor 327 may employ the same ranking function at all of the index servers (e.g., 430A, 430B, 430C . . . 430N) so that ranking scores generated at different index servers for the same query are comparable. Using the same ranking function at all of the index servers also allows query processor 327 at the routing server 420A to combine documents 340 identified in the multiple answers 418A and 418B to the query 332A returned from index servers 430B and 430C into a single answer 334A that is returned to the front-end server 326A and ultimately to the end-user computing device 311A from which the query 332A was received by the front-end server 326A.

According to some embodiments of the invention, the front-end server 326A may apply a conventional spelling correction algorithm and/or a conventional phonetic correction algorithm (e.g., a soundex algorithm) to the obtained search query 332A. The spelling correction algorithm can apply different forms of spelling correction. For example, the spelling correction algorithm can apply a conventional isolated-term correction algorithm (e.g., edit distance and/or k-gram overlap) and/or a conventional context-sensitive correction algorithm. Accordingly, the query 332A forwarded to routing server 420A and routed to index servers 430 may reflect the results of spelling correction and/or phonetic correction performed on tokens of the query 332A by the front-end server 326A.

Index Shard

Figure 5:
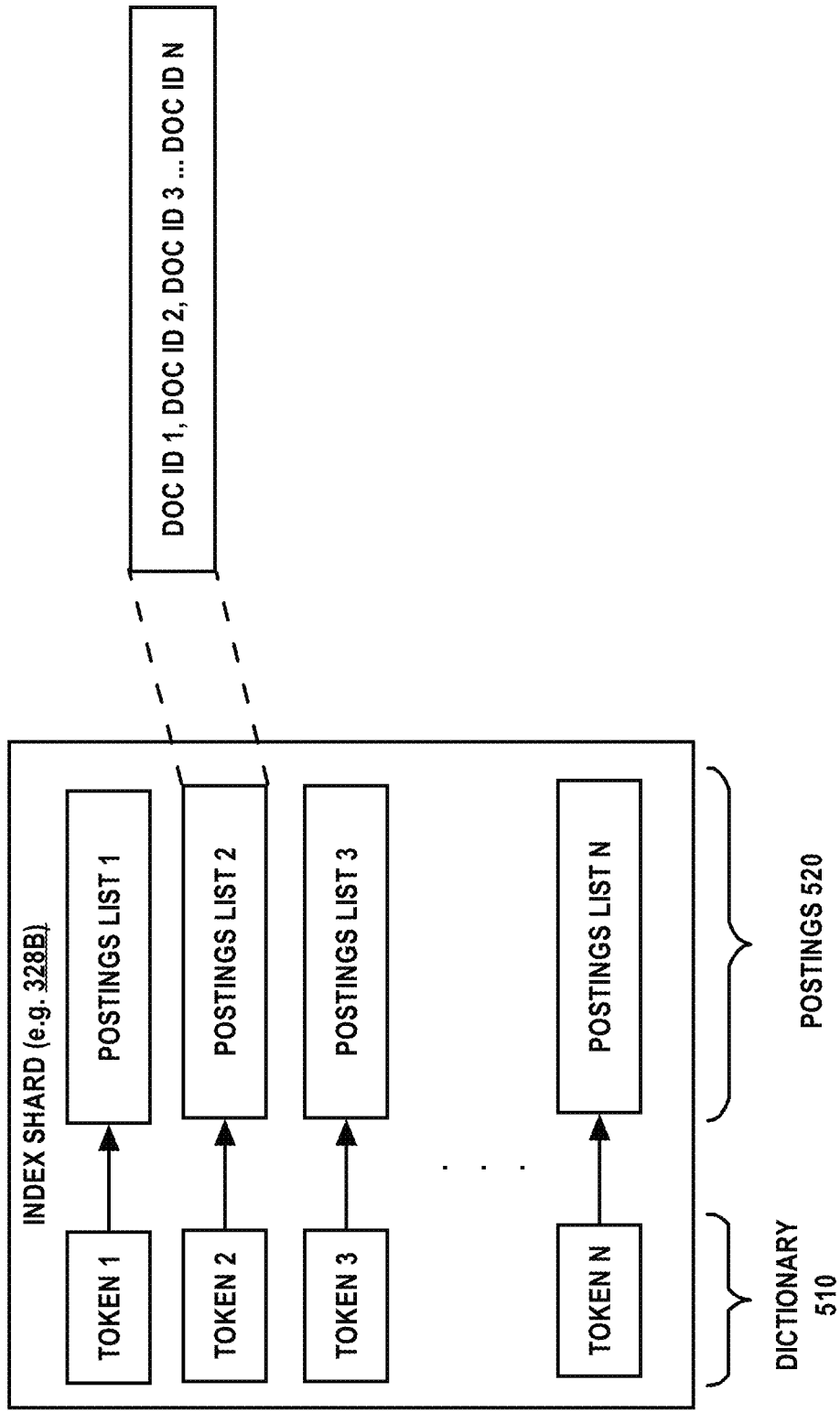
FIG. 5 is a block diagram of an index shard of a sharded document index in accordance with some embodiments of the invention.

Turning now to FIG. 5, it is a block diagram of an index shard (e.g., 328B) of document index 328 in accordance with some embodiments of the invention. According to some embodiments of the invention, an index shard may be structured as an inverted index including a dictionary 510 and a corresponding postings 520.

Dictionary 510 may comprise index tokens (e.g., TOKEN 1, TOKEN 2, TOKEN 3 . . . TOKEN N) by which documents 340 identified in postings 520 are indexed. Dictionary 510 also includes a pointer for each index token (e.g., TOKEN 1) to a postings list (e.g., POSTINGS LIST 2) of one or more document identifiers (e.g., DOC ID 1) that identifies which documents 340 the index token is indexed by (e.g., occurs in).

Dictionary 510 may also comprise information other than index tokens such as, for example, token attribute information such as, for example, token frequency information or other information that may be used by a ranking function of query processor 327 to rank or otherwise determine the relevancy of documents to a query in a query-dependent and/or query-independent manner.

A postings list (e.g., POSTINGS LIST 2) of postings 520 may comprise information other than document identifiers such as, for example, document-token attribute information such as, for example, token frequency of a token within a particular document 340, the position or positions of a token within a particular document 340, or other information that may be used by a ranking function of query processor 327 to rank or otherwise determine the relevancy of documents 340 to a query in a query-dependent and/or query-independent manner.

Document identifiers (e.g., DOC ID 1, DOC ID 2, DOC ID 3 . . . DOC ID N) in postings 520 may be associated with document namespace identifiers to indicate the document namespace to which the identified documents 340 belongs. This association also allows query processor 327 at an index server (e.g., 430B) to restrict an answer (e.g., 417A) to a query (e.g., 332) to identifying only documents 340 that belong to an authorized document namespace to be searched.

For example, an element in a postings list (e.g., POSTINGS LIST 2) may be prefixed with a document namespace identifier that identifies the document namespace to which the document 340 belongs. For example, an element in a postings list (e.g., POSTINGS LIST 2) may be character string data in the format <document namespace identifier>:<document identifier> where <document namespace identifier> is a character string data field identifying a document namespace and <document identifier> is a character string data field identifying a document 340 that belongs to the document namespace. The colon ':' character may be used as a separator character to separate character string data fields within a postings list element. Other separator characters are possible. It also possible to not use a separator character where, for example, character string data fields have fixed lengths. Other formats for the document identifier are possible and the invention is not limited to any particular prefix format.

Instead of prefixing document identifiers in postings lists with document namespace identifiers to associate documents 340 with the document namespaces they belong to, an index shard may comprise a many-to-one mapping that maps a given document identifier to the identifier of the document namespace to which the documents 340 belong. The mapping is many-to-one because a document namespace may contain multiple documents 340.

In some embodiments of the invention, for space efficiency and to reduce the size of postings 520, a document namespace identifier or a document identifier in a postings list (e.g., POSTINGS LIST 2) includes a local identifier that is local to the index shard (e.g., index shard 328B) and substitutes for a global document namespace identifier or a global document identifier that is larger in size (e.g., in terms of number of bytes). The local identifier may be smaller in size (e.g., in terms of number of bytes) than the global document namespace identifier or the global document identifier the local identifier substitutes for.

An index shard (e.g., 328B) may comprise a one-to-one mapping that maps a given local identifier to a global document identifier. Alternatively, there may be two one-to-one mappings, one of the mappings for translating local document namespace identifiers to global document namespace identifiers and the other mapping for translating local document identifiers to global document identifiers. As yet another alternative, there may be a one-to-one mapping for translating a given local document namespace identifier to the global document identifier and the global document namespace identifier of the document namespace to which the document 340 belongs.

In this description, unless otherwise clearly apparent in context, a "document identifier" of a document 340 refers to all possible forms of the document identifier that directly or indirectly (e.g., through an associative array) uniquely identifies the document 340 including a local document identifier of the document 340 and a global document identifier of the document 340.

Similarly, in this description, unless otherwise clearly apparent in context, a "document namespace identifier" of a document namespace refers to all possible forms of the document namespace identifier that directly or indirectly (e.g., through an associative array) uniquely identifies the document namespace including a local document namespace identifier of the document namespace and an global document namespace identifier of the document namespace.

According to some embodiments of the invention, when a query (e.g., 332) is received at an index server (e.g., 430B), query processor 327 at the index server uses the query tokens in the query as keys into a dictionary 510 to identify postings lists in a corresponding postings 520. If there are multiple query tokens in the query, the corresponding postings lists may be merged appropriately depending on how the query tokens are related together as a Boolean expression.

In some embodiments of the invention, query processor 327 at an index server restricts the documents 340 identified in the corresponding postings lists that can be included in an answer (e.g., 417A) to the query to only those documents 340 that belong to an authorized document namespace to be searched. Query processor 327 at the index server does this in some embodiments of the invention by comparing document namespace identifiers associated with document identifiers in the corresponding postings lists to authorized document namespace identifiers associated with the query (e.g., included in the network request that includes the query from a routing server (e.g., 420A)). If a document namespace identifier associated with a document identifier of a document 340 that otherwise satisfies the query matches an authorized document namespace identifier associated with the query, then the document 340 may be included in the answer to the query. However, if the document namespace identifier associated with the document identifier does not match an authorized document namespace identifier associated with the query, then the document 340 is not included in the answer to the query even if the document otherwise satisfies the query. In this way, query processor 327 at index servers 430 may restrict answers to queries to only documents 340 belonging to authorized document namespaces associated with the queries to be searched.

In some embodiments of the invention, an index shard stores multiple dictionary 510/postings 520 pairs. For example, an index shard may store a dictionary 510 and corresponding postings 520 for each of multiple document namespaces assigned to the index shard or for each of multiple document namespace groups assigned to the index shard.

In some embodiments of the invention, an index shard (e.g., 328B) may be organized into separately identifiable sets of index database files 351 and volatile memory data structures according to the identifiers of the document namespace groups assigned to the index shard. In this case, there may be a separate dictionary 510 or separate dictionaries 510 and corresponding postings 520 for each document namespace group assigned to the index shard. When a query (e.g., 332) is received at an index server (e.g., 430B), query processor 327 at the index server can use the document namespace group identifiers associated with the authorized document namespace identifiers in the network request from the routing server to determine which dictionary 510 or dictionaries 510 and corresponding postings 520 to access.

In some embodiments of the invention, an index shard (e.g., 328B) may be organized into separately identifiable sets of index database files and volatile memory data structures according to the identifiers of the document namespaces assigned to the index shard. In this case, there may be a separate dictionary 510 or separate dictionaries 510 and corresponding postings 520 for each document namespace assigned to the index shard. When a query (e.g., 332) is received at an index server (e.g., 430B), query processor 327 at the index server can use the document namespace identifiers in the network request from the routing server to determine which dictionary 510 or dictionaries 510 and postings 520 to access.

In some embodiments of the invention, an index shard stores separate dictionary 510/postings 520 pairs for processing different types of queries. For example, for a given document namespace or a given document namespace group associated to an index shard, the index shard may store a first dictionary 510/postings 520 pair for processing non-completion queries and a second dictionary 510/postings 520 pair for processing completion queries. Storing separate dictionary 510/postings 520 pairs allows the structure and content of a dictionary 510 and the corresponding postings 520 to be tailored for processing a certain type of query. For example, a dictionary 510 for processing completion queries may include only index tokens for filenames of documents as opposed index tokens for the full-text of the documents to reduce the size of the dictionary in terms of bytes consumed when stored on non-volatile memory (e.g., flash memory) or in volatile memory (e.g., RAM) and thereby allow query processor 327 to more quickly process completion queries.

Query processor 327 at an index server (e.g., 430C) may load a dictionary 510 (or a portion thereof) from non-volatile storage (e.g., flash memory) into volatile memory (e.g., RAM) for more efficient access. A postings list (e.g., POSTINGS LIST 2) may be stored in non-volatile memory (e.g., in flash memory) of an index server (e.g., 430C) and/or cached in volatile memory (e.g., RAM) of the index server for more efficient access. Cached postings lists may be evicted from volatile memory of the index server according to a cache eviction policy such as, for example, a least recently accessed policy. Query processor 327 at an index server (e.g., 430B) may also cache in volatile memory a postings list that is generated as a result of a merge algorithm performed on multiple posting lists retrieved from a postings 520. By doing so, query processor 327 at the index server may avoid having to perform the merge algorithm on the multiple postings lists at a later time.

Continuing to refer to FIG. 5, according to some embodiments of the invention, to facilitate processing of completion queries, index tokens in a dictionary 510 may be prefixed by document namespace identifiers and the prefixed index tokens may be sorted within the dictionary in a lexicographical order of the prefixed index tokens. A dictionary 510 configured in this way is referred to herein as a "completion" dictionary.

In some embodiments of the invention, the postings list associated with a prefixed index token may comprise document identifiers of documents 340 that belong to the document namespace identified in the prefixed index token. Thus, an index token may appear in a completion dictionary more than once, once for each of multiple document namespaces, if the completion dictionary includes prefixed index tokens for more than one document namespace.

For example, a prefixed index token in a completion dictionary may have the form <document namespace identifier>:<index token> where <document namespace identifier> is a character string data field identifying a document namespace and <index token> is a character string data field including the characters of the index token. The colon ':' character, or other character, nay be used as a separator character to separate character string data fields within the prefixed index token. An example of a prefixed index token is [abcd:private] (without the enclosing brackets) where "abcd" is the identifier of a document namespace and "private" is the index token.

By sorting prefixed index tokens within a completion dictionary according to a lexicographical sorting of the prefixed index tokens, a query processor 327 at an index server (e.g., 430B) can more efficiently identify possible completions to a completion token of a completion query. In particular, as a result of the lexicographical sorting of prefixed index tokens, index tokens in a completion dictionary that belong to the same document namespace and that share a prefix that matches the completion token may be stored (clustered) near each other (e.g., in consecutive or contiguous memory locations) when the completion dictionary is stored in non-volatile memory or volatile memory. Such clustering facilitates sequential memory access when the query processor accesses the completion dictionary to determine possible completions to a completion token and also reduces or eliminates random memory access when the accessing the completion dictionary.

For example, index tokens "concession", "conclude", "conclusion", "concrete", and "concurrent" for document namespace "abcd" may be stored near each other in memory as prefixed index tokens "abcd: concession", "abcd:conclude", "abcd:conclusion", "abcd:concrete", and "abcd:concurrent", respectively. When processing a completion query with, for example, the completion token "con" and for which a particular document namespace having an identifier of, for example, "abcd" is an authorized document namespace to search, the query processor may generate an index key of "abcd:con" for accessing a completion dictionary. Since the prefixed index tokens are stored near each other in memory as a result of the lexicographical sorting, the query processor can more efficiently identify the index tokens "concession", "conclude", "conclusion", "concrete", and "concurrent" as possible completions for the completion token "con" in the document namespace "abcd" than if the prefixed index tokens were not stored near each other in memory.

In addition to prefixed index tokens of a completion dictionary being stored near each other in memory as a result of a lexicographical sorting of the prefixed index tokens, the pointers (e.g., addresses) of the completion dictionary associated with the sorted prefixed index tokens to the storage locations of the corresponding postings lists may also be stored near each other in memory as a result of a lexicographical sorting of the prefixed index tokens. In particular, a pointer to a storage location of a postings list for a prefixed index token may be stored near the prefixed index token in memory. For example, the pointer and the prefixed index token may be stored in the same memory block or same set of consecutive or contiguous memory blocks. Thus, not only can the query processor, for example, more efficiently identify the index tokens "concession", "conclude", "conclusion", "concrete", and "concurrent" as possible completions in the document namespace "abcd" for the completion token "con", the query processor can also more efficiently identify the storage locations of the posting lists corresponding to those index tokens as a result of the lexicographical sorting.

In some embodiments of the invention, sorting prefixed index tokens of a completion dictionary in a lexicographical order of the prefixed index tokens includes sorting a plurality of records (data structures) of the completion dictionary in which each such record includes a prefixed index token and an associated pointer (e.g., address) to a volatile or non-volatile memory location at which the postings list for the prefixed index token is stored. The plurality of records may be sorted according to a lexicographical ordering of their prefixed index tokens. Then the sorted records may be stored in consecutive or contiguous blocks of computer memory (e.g., volatile memory or non-volatile memory).

The following description presents method steps that may be implemented using computer-executable instructions, for directing operation of one or more computing devices under processor control. The computer-executable instructions may be stored on a computer-readable medium, such as CD, DVD, flash memory, or the like. The computer-executable instructions may also be stored as a set of downloadable computer-executable instructions, for example, for downloading and installation from an Internet location (e.g., Web server).

While a certain order for the method steps may be implied by the figures and the following description, it will be understood that, unless the context clearly indicates otherwise, the method steps may be performed in a different order than is shown and/or described. Further, unless the context clearly indicates otherwise, the method steps may be performed in parallel (concurrently) with one another.

Process for Personal Searching

Figure 6:
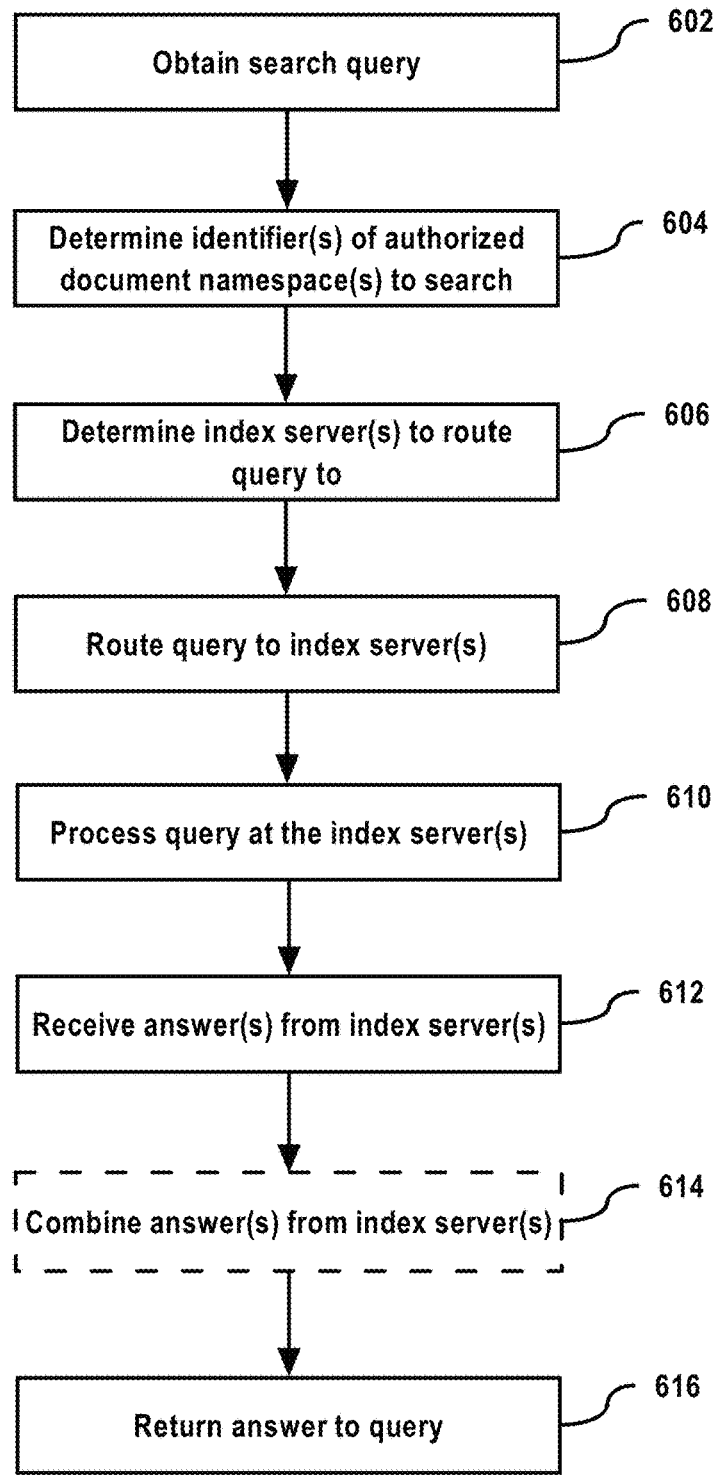
FIG. 6 is a flow diagram illustrating a process for personal searching performed by a serving system of a multi-user search system in accordance with some embodiments of the invention.

FIG. 6 is a flow diagram illustrating a process 600 for personal searching performed by a serving system 325 of a multi-user search system 320 in accordance with some embodiments of the invention.

At step 602, a search query 332A is obtained by a front-end server 326A from an authenticated user's end-user computing device 311A as described herein. The search query 332A can be a completion query or a non-completion query.

At step 604, the front-end server 326A determines one or more identifiers of one or more authorized document namespaces to search as described herein. The front-end server 326A then forwards the query 332A and the one or more identifiers of the one or more authorized document namespaces to search to a routing server 420A as described herein.

At step 606, the routing server 420A determines one or more index servers 430 to which the query 332A should be routed to as described herein. A process in some embodiments of the invention performed by the routing server 420A for determining which index server(s) 430 to route the query 332A to may be as described herein and below with respect to FIG. 7.

At step 608, the routing server 420A routes the query 332A to each of the one or more index servers 430 determined at step 606 to route the query 332A to as described herein.

At step 610, the query 332A is processed by the query processor 327 at each of the index servers 430 to which the query 332A is routed to at step 608 as described herein. As mentioned, the query 332A can a completion query or a non-completion query. A process in some embodiments of the invention performed by the query processor 327 at an index server (e.g., 430B) for generating a personalized answer (e.g., 418A) to the query 332A when the query 332A is a non-completion query may be as described herein and below with respect to FIG. 8. A process in some embodiments of the invention performed by the query processor 327 at an index server (e.g., 430B) for generating a personalized answer (e.g., 418A) to the query 332A when the query 332A is a completion query may be as described herein and below with respect to FIG. 9.

At step 612, the routing server 420A receives a personalized answer (e.g., 418A) to the query 332A from each of the index servers 430 to which the query 332A was routed to at step 608 as described herein. If the query 332A was routed to multiple index servers 430 at step 608, then the routing server 420A may receive multiple corresponding personalized answers 418 at step 612.

If multiple personalized answers 418 are received by the routing server 420A at step 612, then the routing server 420A at step 614 may combine the multiple personalized answers into a single personalized answer 334A that is then returned to the front-end server 326A as described herein.

At step 616, the front-end server 326A returns the personalized answer 334A to the query 332 to the end-user computing device 311A from which the query 332A was received as described herein.

Deterministic Query Routing

Figure 7:
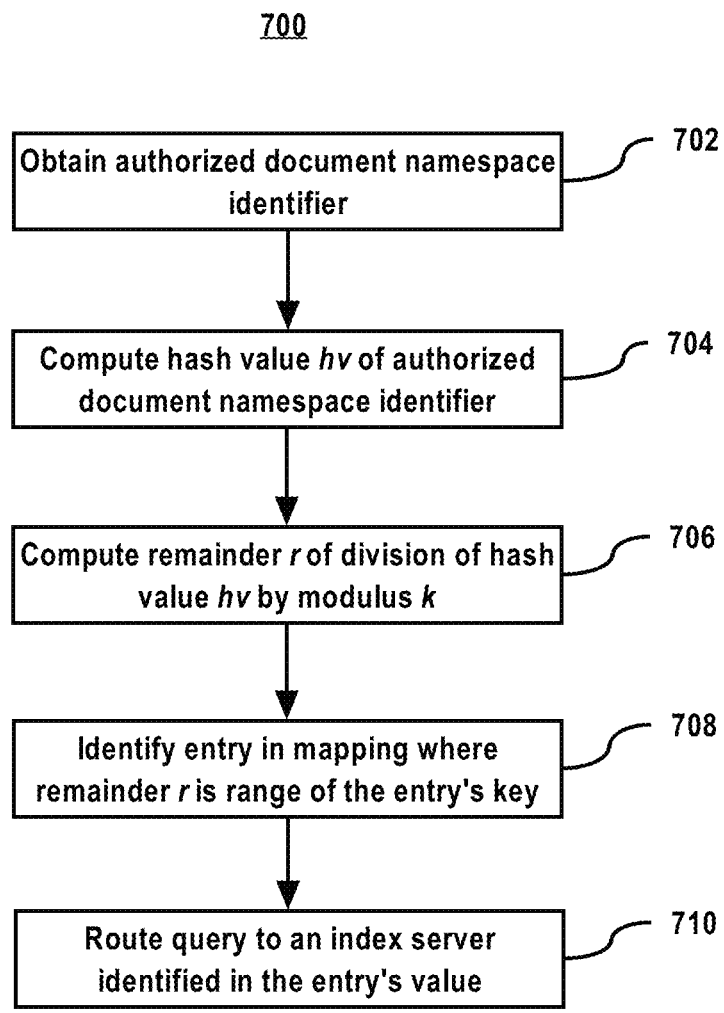
FIG. 7 is a flow diagram illustrating a process performed by a routing server for determining an index server that stores an index shard that indexes documents belonging to a given document namespace in accordance with some embodiments of the invention.

FIG. 7 is a flow diagram illustrating a process 700 performed by the routing server 420A for determining an index server (e.g., 430B) that stores an index shard (e.g., 328B) that indexes documents 340 belonging to a given document namespace according to some embodiments of the invention.

At step 702, the routing server 420A obtains an identifier for each authorized document namespace to search as described herein. For example, the routing server 420A may obtain the identifier(s) in a network request received from the front-end server 326A that also includes a query 332A At step 704, a deterministic mapping function 416 of the routing server 420A applies a hash algorithm (e.g., a message digest algorithm) to each of the authorized document namespace identifiers to generate a hash value hv for each of the authorized document namespace identifiers as described herein. Any number of different hash algorithms may be used. However, the hash algorithm used should be deterministic in the sense that for a given authorized document namespace identifier the hash algorithm consistently outputs the same hash value. Non-limiting examples of some suitable hash algorithms that may be used at step 704 include the MD4, MD5, SHA-1, and SHA2 message digest algorithms.

At step 706, for each authorized document namespace to search, the deterministic mapping function 416 of the routing server 420A computes the remainder r of the division of the hash value hv computed for the authorized document namespace at step 704 by a modulus k as described herein.

At step 708, for each authorized document namespace to search, the deterministic mapping function 416 of the routing server 420A identifies a mapping entry in mapping 417 where the remainder r computed for the authorized document namespace at step 706 is within the range of the entry's key as described herein. As mentioned, an entry in mapping 417 may comprise a key and a value. The entry's key may define a sub-range of consecutive values in the range 0 to k−1. The entry's value may comprise a hostname and/or a network address of an index server (e.g., 430B). For example, the entry's value may comprise a hostname or network address of the index server by which the routing server 420A can generate and send a network request to the index server including the query 332A among other various other information.

At step 710, for each index server identified at step 708, the routing server 420A routes the query 332A to the index server as described herein.

Processing Non-Completion Queries

Figure 8:
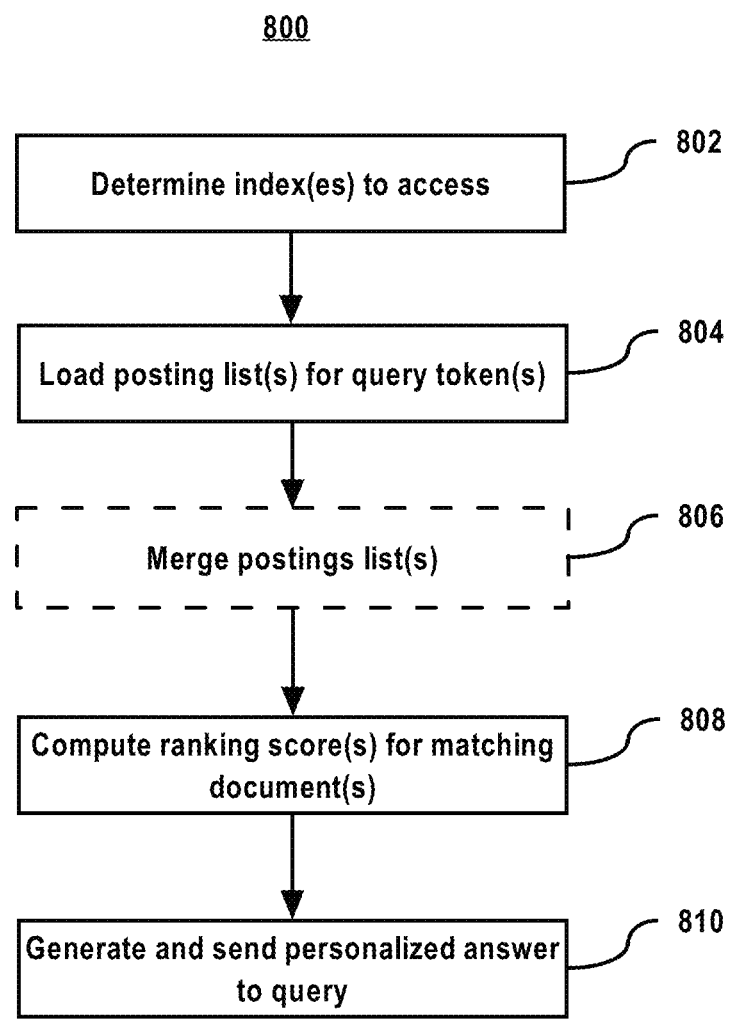
FIG. 8 is a flow diagram illustrating a process performed by a query processor at an index server for generating a personalized answer to a non-completion query in accordance with some embodiments of the invention.

FIG. 8 is a flow diagram illustrating a process 800 performed by the query processor 327 at an index server (e.g., 430B) for generating a personalized answer (e.g., 418A) to a query 332A when the query 332A is a non-completion query in accordance with some embodiments of the invention. The query 332A may be received from a routing server (e.g., 420A) in a network request. The network request may also include one or more identifiers of one or more authorized document namespaces to search. In addition, each such authorized document namespace identifier may be associated in the network request with an identifier of a document namespace group to which the document namespace belongs.

At step 802, the query processor 327 at the index server determines one or more indexes of an index shard (e.g., 320B) at the index server to access. Each such index may include a dictionary (e.g., 510) and corresponding postings (e.g., 520) stored in non-volatile memory (e.g., flash memory) of the index server in an index database file 351. Each such index may also have a volatile memory component. For example, the dictionary of the index may be stored in volatile memory of the index server. In addition, various postings lists from the postings of the index may be cached in volatile memory of the index server from time to time. The query processor 327 may evict cached postings lists from volatile memory according to a cache eviction policy (e.g. LRU).

According to some embodiments, the index database file 351 of an index is treated as immutable and updates to the index are stored in volatile memory of the index server. The updates may include a new index token by which a document 340 is to be indexed in the index and an index token by which a document 340 is no longer to be indexed in the index. More specifically, a "delta" postings list for an index token in the index stored in volatile memory at the index server may reflect updates to the "base" postings list for the index token stored in the index database file 351 of the index.

For example, assume an index database file 351 of an index at an index server (e.g., 430A) indexes a document D2 by the tokens "solved", "two" and "problems". In this case, the index database file 351 may comprise three base postings lists, one for each of the index tokens "solved", "two", and "problems". Next, assume document D2 is edited to replace "solved two problems" with "solved three problems". Next, assume the index server receives one or more index mutations 352 specifying that document D2 is no longer to be indexed by the index token "two" but is now to be indexed by index token "three". To represent these mutations 352, a delta postings list for the index token "two" may be stored in volatile memory of the index server to represent (e.g., with a deletion bit vector) that document D2 is no longer indexed by the index token "two" and another delta postings list for the index token "three" may be stored in volatile memory of the index server to represent (e.g., by including an identifier of document D2 in the postings list) that document D2 is indexed by index token "three". To represent these mutations 352, it is not necessary to modify the index database file 351. When processing a query (e.g., 332A), the query processor 327 at the index server may consult both the base postings list for a given query token in the index database file 351 (which may be cached in RAM) and a delta postings list for the given query token stored in volatile memory. The query processor 327 may merge (e.g., intersect) the delta postings list and the base postings list to determine the documents that satisfy the given query token.

According to some embodiments, the query processor 327 at the index server determines at step 802 the index(es) to access based on the document namespace group identifier(s) in the network request from the routing server 420A. For example, the query processor 327 may determine to access certain index database file(s) 351 and/or certain data structures in volatile memory (e.g., dictionaries, postings lists, etc.) based on the document namespace group identifiers in the network request from the routing server 420A.

At step 804, for each index to access determined at step 802, postings list(s) for the query token(s) in the query 332A are loaded from the index. Such loading may include retrieving a postings list stored in non-volatile memory at the index server and storing the postings list in volatile memory at the index server. In some cases, the postings list may already be stored (cached) in volatile memory at the index server. In this case, there may be no need to retrieve the postings list from non-volatile memory at the index server.

At step 806, if multiple postings lists are loaded at step 804, then the multiple postings lists are merged accordingly to produce a single "results" postings list that may comprise one or more identifiers of one or more documents that satisfy (match) the query 332A. Various different algorithms may be used to merge postings lists for the purpose of determining documents that satisfy (match) a given query. Embodiments of the invention are not limited to any particular merge algorithm. If only one postings list was loaded at step 804, for example, because there is only one query token in the query 332A, then that one loaded postings list may be the results postings list.

At step 808, the query processor 327 at the index server rank-orders the documents in the results postings list matching the query 332A according to a ranking algorithm. The ranking algorithm may involve computing a ranking score for each matching document with respect to the query 332A. Various different ranking algorithms may be used and embodiments of the invention are not limited to any particular ranking algorithm. For example, the ranking algorithm may compute ranking scores based on on query-dependent metrics and/or query-independent metrics for query tokens and matching documents.

At step 810, the query processor 327 at the index server generates a personalized answer (e.g., 418A) to the query 332A and sends the answer in a network response to the routing server 420A. The personalized answer may identify only matching documents that belong to an authorized document namespace to search. To facilitate this, each matching document identified in the results postings list may be associated with an identifier of the document namespace to which the matching document belongs. The query processor 327 at the index server may compare the document namespace identifier for a matching document to the set of authorized document namespace identifier(s) included in the network request from the routing server 420A to determine whether the document should be identified in the personalized answer. If, based on this comparison, a matching document belongs to an authorized document namespace, then the matching document may be identified in the personalized answer. Otherwise, the matching document may not be identified in the personalized answer.

Processing Completion Queries

Figure 9:
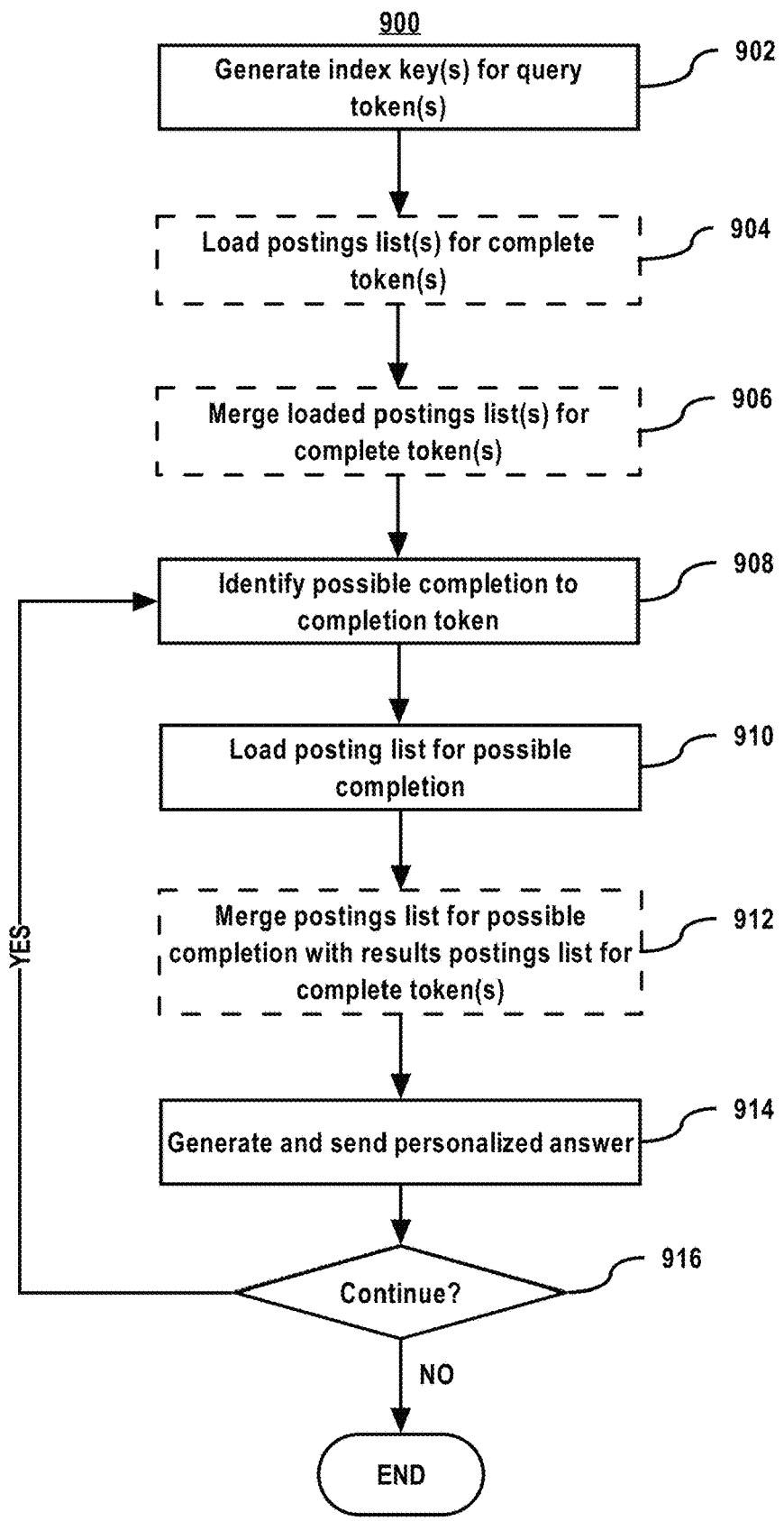
FIG. 9 is a flow diagram illustrating a process performed by a query processor at an index server for generating a personalized answer to a completion query in accordance with some embodiments of the invention.

FIG. 9 is a flow diagram illustrating a process 900 performed by the query processor 327 at an index server (e.g., 430B) for generating a personalized answer (e.g., 418A) to a query 332A when the query 332A is a completion query in accordance with some embodiments of the invention.

The completion query 332A may be received from a routing server (e.g., 420A) in a network request. The network request may also include one or more identifiers of one or more authorized document namespaces to search. In addition, each such authorized document namespace identifier may be associated in the network request with an identifier of a document namespace group to which the document namespace belongs. In addition, the network request may indicate or specify which query token of the completion query 332A is the completion token. Any other query tokens in the completion query 332A are considered complete tokens.

According to some embodiments of the invention, an index shard (e.g., 328B) at an index server (e.g., 430B) may comprise a "completion" index for each of the one or more document namespace groups assigned to the index shard. Each such completion index may comprise a completion dictionary and corresponding postings that together index documents in the one or more document namespaces that belong to the document namespace group of the completion index.

According to some embodiments of the invention, the query processor 327 at an index server (e.g., 430A) accesses the completion index for a document namespace group when processing a completion query 332A for an authorized document namespace to search belonging to the document namespace group of the completion index.

According to some embodiments of the invention, a completion index indexes only the filenames of documents. That is, the index tokens in the completion dictionary are limited to tokens extracted from the filenames of documents in the one or more document namespaces that belong to the document namespace group of the completion index. By doing this, the size of the completion index may be smaller relative to a full-text index or other index for the document namespace group, thereby facilitating more efficient processing of completion queries 332 by the query processor 327 at the index server while at the same time still providing answers 418 that are relevant to the completion queries 332.

As mentioned, a completion dictionary includes prefixed index tokens sorted in a lexicographical sort order. Each such prefixed index token includes an index token prefixes with a document namespace identifier. The sorted prefixed index tokens may be stored (clustered) near each other in the sorted order in volatile and/or non-volatile memory. By doing so, iterating over the prefixed index tokens in the sort order may facilitate sequential memory access during the iterating and reduce random memory access during the iterating, thereby making it more efficient for the query processor 327 at the index server to iterate over a set of prefixed index tokens in the completion dictionary that share a common prefix.

Turning now to FIG. 9, at step 902, the query processor 327 at the index server generates index keys for the query tokens of the completion query 332A for use in accessing one or more completion dictionaries. In general, the index key is generated by prefixing the query token with an authorized document namespace identifier in a form that matches the form of the prefixed index tokens in the completion dictionary. For example, if the form of prefixed index tokens in the completion dictionary is <document namespace identifier>:<index token> than the form of generated index keys may be <authorized document namespace identifier>:<query token>.

At step 902, the query processor 327 at the index server may generate multiple index keys for each query token, one for each of multiple authorized document namespaces to search, where each such authorized document namespace to search is assigned to an index shard of the index server.

Steps 904-916 may be performed by the query processor 327 at the index server for each authorized document namespace to search specified in the network request from the routing server 420A.

At step 904, for a given authorized document namespace to search, any index key(s) generated at step 902 for any complete token(s) of the completion query 332A are used to access the completion dictionary for the document namespace group to which the given authorized document namespace belongs. In particular, the postings lists(s) associated with the index key(s) are loaded for the complete token(s) in the completion query 332A.

At step 906, for the given authorized document namespace to search, any postings lists(s) loaded for the complete token(s) at step 904 are merged to produce a "results" postings list for the complete token(s) in the completion query 332A.

In addition to steps 908-916 being performed for each authorized document namespace to search specified in the network request from the routing server 420A, steps 908-916 may be performed for each of multiple possible completion tokens identified in the completion dictionary as possible completions to the completion token in the completion query 332A.

Steps 908-916 performed for an authorized document namespace generally involves accessing the completion dictionary with the index key generated for the completion token and iterating over a plurality of prefixed index tokens in a lexicographical order of the plurality of prefixed index tokens until a stop condition is reached. Each of the plurality of prefixed index tokens that are iterated over for the authorized document namespace may comprise an identifier of the authorized document namespace as a prefix, the index token as a suffix, and with the completion token being a prefix of or matching the index token. Also during the iterating, for each prefixed index token of the plurality of prefixed index tokens, a determination is made whether any documents identified in a postings list associated with the prefixed index token satisfies the completion query. Information for a document in the postings list that does satisfy the completion query may be returned in an answer to the completion query. In some embodiments, a prefixed index token is from a filename of a document and the information returned in an answer to a completion query for the document is the document's filename.

In some embodiments of the invention, instead of iterating over the plurality of prefixed in tokens in a lexicographical order of the prefixed index tokens, prefixed index tokens are iterated over in decreasing order of the corresponding postings lists sizes, where the size of a postings list is determined by the number of documents identified in the postings list. By iterating over prefixed index tokens in this order, the possible completions to the completion token by which the most documents are indexed are considered for inclusion in an answer to the completion query first.

To facilitate this iteration, an auxiliary per-namespace token-frequency mapping may be maintained at the index server. Each entry in the mapping includes a key and a corresponding value. Each such key includes an index token and each such value includes the size of the postings list in the completion dictionary for the index token and the document namespace. The entries of the auxiliary mapping may be sorted in the mapping in a lexicographic order of the index tokens of the entry keys and the entries may be stored in their sorted order (clustered) in contiguous volatile and/or non-volatile memory locations. This allows the query processor 327 at the index server to more efficiently identify all index tokens in the auxiliary mapping that share a common prefix that matches the completion token in the completion query 332A. Once all such index tokens are identified, they are sorted in descending order of their postings lists sizes as specified by the entry values in auxiliary mapping. The resulting sorted order of the index tokens is the iteration order for the index tokens when accessing the completion dictionary and considering possible completions to the completion token. Because the auxiliary mapping does not store the actual postings lists for index tokens, the auxiliary mapping may be much smaller in size in terms of bytes that that the completion index. As a result, the iteration order for the index tokens can be determined from the auxiliary mapping with fewer memory I/O operations that if the iteration order was determined from the completion index itself.

At step 908, the query processor 327 determines the next index token in the iteration order that is a possible completion to the completion token. As just discussed, the iteration order can be based on a lexicographical ordering of index tokens that share a common prefix that matches the completion token or based on a descending order of posting lists sizes for the index tokens.

At step 910, the query processor 327 loads the postings list for the current possible completion token to the completion token in the query 332A determined at step 908 in the iteration. In some cases, the postings list for the current possible completion token may already be stored in volatile memory at the index server. In this case, it may not be necessary to retrieve the postings list from non-volatile memory.

At step 912, if there were any complete token(s) in the completion query 332A, then the results postings list for the complete token(s) determined at step 906 is merged with the postings list for the current possible completion token to the completion token determined at step 910 in the iteration. This current "results" postings list for the completion query 332A resulting from this merge may comprise identifiers of one or more documents in the authorized document namespace that satisfy the completion query 332A where the completion token is replaced with the current possible completion token. If there were not any complete tokens in the completion query 332A, then the current results postings list for the completion query 332A may be the postings list loaded for the current possible completion token at step 910 in the iteration.

At step 914, if the current results postings list for the completion query 332A is non-empty (i.e., it identifies at least one document in the authorized document namespace), then information for each document identified in the current results postings list for the completion query 332A may be sent in an answer (e.g., 418A) to the completion query 332A. In some embodiments, this information includes the filename of the document.

While in some embodiments, the filename of the document is returned in an answer (e.g., 418A) to a completion query 332A, the completion query 332A with the completion token replaced with the current possible completion token is returned in an answer (e.g., 418A) to a completion query 332A if the current results postings list for the completion query 332A is non-empty. In either case, information returned in an answer (e.g., 418A) to a completion query 332A may be ultimately presented at the end-user's computing device for selection by the user and for submission to the serving system 325 as another query 332A.

At step 916, the query processor 327 at the index server determines whether to continue the iteration over possible completion tokens to the completion token in the completion query 332A. According to some embodiments, the query processor 327 stops the iteration if a stop condition has been reached. According to some embodiments, the stop condition is reached when any of the following conditions becomes true:

A threshold number of documents satisfying the completion query 332A with the completion token in the completion query 332A substituted with a possible completion token have been identified, A threshold number of possible completion tokens have been considered, or A query execution timer has elapsed.

If, at step 916, it is determined that the stop condition has been reached, then the iteration over possible completion tokens to the completion token in the completion query 332A ends. Otherwise, the iteration continues again at step 908 with the next possible completion token.

The above process for processing completion queries provides a number of benefits to end-users. For one, the process may reduce the time taken for a user to receive an answer identifying a document of interest. For another, the process may reduce the number of keystrokes that a user needs to enter into a search field to find a document of interest. For yet another reason, the process may save the user the burden of remembering the correct spelling of a token.

While in some embodiments the above process provides personalized search query auto-completion for document filenames, the above process provides personalized search query auto-completion for document contents in other embodiments.

EXTENSIONS AND ALTERNATIVES

While the invention is described in some detail with specific reference to a single-preferred embodiment and certain alternatives, there is no intent to limit the invention to that particular embodiment or those specific alternatives. Therefore, those skilled in the art will appreciate that modifications may be made to the preferred embodiment without departing from the teachings of the invention.

The invention claimed is:

1. A computer-implemented method for efficiently identifying matching and authorized indexed documents in a multi-user search system, comprising:
    storing an index dictionary having a plurality of index tokens for indexing a plurality of documents in a plurality of document namespaces by a plurality of tokens, each index token of the plurality of index tokens having an identifier of a document namespace of the plurality of document namespaces as part of the index token and having a token of the plurality of tokens as another part of the index token;
    receiving a search query having a query token;
    generating an index key that is composed of both (a) an identifier of a document namespace that a user account associated with the search query is authorized to access, and (b) the query token;
    accessing the index dictionary with the index key to iterate over index tokens of the plurality of index tokens until a stop condition is reached, each index token iterated over having the identifier of the document namespace that the user account is authorized to access as part of the index token, each index token iterated over having a respective token as part of the index token, and each index token iterated over having the query token as either the respective token of the index token or as a prefix of the respective token of the index token;
    returning an answer to the search query based on the accessing; and
    wherein the computer-implemented method is performed by a computing system having one or more processors and storage media storing one or more programs including instructions configured to perform the computer-implemented method.

2. The computer-implemented method of claim 1, wherein:
    the identifier of the document namespace precedes the query token within the index key generated; and
    for each index token iterated over, the identifier of the document namespace precedes the respective token of the index token within the index token.

3. The computer-implemented method of claim 1, further comprising:
    iterating over the index tokens in a lexicographical order of the index tokens.

4. The computer-implemented method of claim 1, further comprising:
    iterating over the index tokens in a descending order of sizes of postings lists associated with the index tokens.

5. The computer-implemented method of claim 4, wherein a size of a postings list is determined based on a number of documents identified in the postings list.

6. The computer-implemented method of claim 1, wherein the stop condition is reached when a threshold number of documents are identified in postings lists associated with the index tokens iterated over.

7. The computer-implemented method of claim 1, wherein the stop condition is reached when a threshold number of index tokens are iterated over.

8. The computer-implemented method of claim 1, wherein the stop condition is reached when a query execution timer elapses.

9. One or more non-transitory storage media comprising:
one or more programs, the one or more programs including instructions which, when executed by a computing system having one or more processors, causes the computing system to perform:
storing an index dictionary having a plurality of index tokens for indexing a plurality of documents in a plurality of document namespaces by a plurality of tokens, each index token of the plurality of index tokens having an identifier of a document namespace of the plurality of document namespaces as part of the index token and having a token of the plurality of tokens as another part of the index token;
receiving a search query having a query token;
generating an index key that is composed of both (a) an identifier of a document namespace that a user account associated with the search query is authorized to access, and (b) the query token;
accessing the index dictionary with the index key to iterate over index tokens of the plurality of index tokens until a stop condition is reached, each index token iterated over having the identifier of the document namespace that the user account is authorized to access as part of the index token, each index token iterated over having a respective token as part of the index token, and each index token iterated over having the query token as either the respective token of the index token or as a prefix of the respective token of the index token; and
returning an answer to the search query based on the accessing.

10. The one or more non-transitory storage media of claim 9, wherein:
the identifier of the document namespace precedes the query token within the index key generated; and
for each index token iterated over, the identifier of the document namespace precedes the respective token of the index token within the index token.

11. The one or more non-transitory storage media of claim 9, further comprising instructions which, when executed by the computing system, causes the computing system to perform:
iterating over the index tokens in a lexicographical order of the index tokens.

12. The one or more non-transitory storage media of claim 9, further comprising instructions which, when executed by the computing system, causes the computing system to perform:
iterating over the index tokens in a descending order of sizes of postings lists associated with the index tokens.

13. The one or more non-transitory storage media of claim 9, wherein the stop condition is reached when a threshold number of documents are identified in postings lists associated with the index tokens iterated over.

14. The one or more non-transitory storage media of claim 9, wherein the stop condition is reached when a threshold number of index tokens are iterated over.

15. The one or more non-transitory storage media of claim 9, wherein the stop condition is reached when a query execution timer elapses.

16. A computing system comprising:
one or more processors;
storage media;
one or more programs stored in the storage media, the one or more programs including instructions which, when executed by the computing system, causes the computing system to perform:
storing an index dictionary having a plurality of index tokens for indexing a plurality of documents in a plurality of document namespaces by a plurality of tokens, each index token of the plurality of index tokens having an identifier of a document namespace of the plurality of document namespaces as part of the index token and having a token of the plurality of tokens as another part of the index token;
receiving a search query having a query token;
generating an index key that is composed of both (a) an identifier of a document namespace that a user account associated with the search query is authorized to access, and (b) the query token;
accessing the index dictionary with the index key to iterate over index tokens of the plurality of index tokens until a stop condition is reached, each index token iterated over having the identifier of the document namespace that the user account is authorized to access as part of the index token, each index token iterated over having a respective token as part of the index token, and each index token iterated over having the query token as either the respective token of the index token or as a prefix of the respective token of the index token; and
returning an answer to the search query based on the accessing.

17. The computing system of claim 16, wherein:
the identifier of the document namespace precedes the query token within the index key generated; and
for each index token iterated over, the identifier of the document namespace precedes the respective token of the index token within the index token.

18. The computing system of claim 16, further comprising instructions which, when executed by the computing system, causes the computing system to perform:
iterating over the index tokens in a lexicographical order of the index tokens.

19. The computing system of claim 16, further comprising instructions which, when executed by the computing system, causes the computing system to perform:
iterating over the index tokens in a descending order of sizes of postings lists associated with the index tokens.

20. The computing system of claim 16, wherein the stop condition is reached when a threshold number of documents are identified in postings lists associated with the index tokens iterated over.

* * * * *